United States Patent
Kadoma et al.

(10) Patent No.: US 10,529,980 B2
(45) Date of Patent: Jan. 7, 2020

(54) GRAPHENE COMPOUND, METHOD FOR FORMING GRAPHENE COMPOUND, AND POWER STORAGE DEVICE

(71) Applicant: Semiconductor Energy Laboratory Co., Ltd., Kanagawa-ken (JP)

(72) Inventors: Hiroshi Kadoma, Kanagawa (JP); Teppei Oguni, Kanagawa (JP); Satoshi Seo, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 141 days.

(21) Appl. No.: 15/646,626

(22) Filed: Jul. 11, 2017

(65) Prior Publication Data

US 2018/0019462 A1 Jan. 18, 2018

(30) Foreign Application Priority Data

Jul. 13, 2016 (JP) ................... 2016-138106

(51) Int. Cl.
*C01B 32/194* (2017.01)
*H01M 4/1393* (2010.01)
(Continued)

(52) U.S. Cl.
CPC ......... *H01M 4/1393* (2013.01); *C01B 32/194* (2017.08); *H01M 2/1686* (2013.01);
(Continued)

(58) Field of Classification Search
CPC .... H01M 4/1393; H01M 4/0471; H01M 4/60; H01M 10/0562; H01M 14/1395;
(Continued)

(56) References Cited

U.S. PATENT DOCUMENTS 7,491,471 B2 2/2009 Yamaguchi et al.
8,755,169 B2 6/2014 Kuriki et al.
(Continued)

FOREIGN PATENT DOCUMENTS

CN 102701191 A 10/2012
CN 102775919 A 11/2012
(Continued)

OTHER PUBLICATIONS

Matsuo, Yoshiaki, Akihiro Hayashida, and Kentaro Konishi. "Porous properties of pillared carbons prepared from the thermal reduction of graphite oxide repeatedly silylated with nnethyltrichlorosilanes." Frontiers in Materials 2 (2015): 21.*
(Continued)

*Primary Examiner* — Richard M Rump
(74) *Attorney, Agent, or Firm* — Husch Blackwell LLP

(57) ABSTRACT

A material that can be used in a wide temperature range and a manufacturing method thereof are provided. A graphene compound has a substituted or unsubstituted chain group. The chain group has one or more ester groups or carboxyl groups and contains a Si atom. The chain group is bonded to a graphene layer through the Si atom. A method for forming a graphene compound includes a step of stirring graphene oxide and a Lewis base and a step of mixing a silicon compound having one or more ester groups or carboxyl groups into the mixed solution and stirring the obtained mixed solution. The Lewis base is butylamine, pentylamine, hexylamine, diethylamine, dipropylamine, dibutylamine, triethylamine, tripropylamine, or pyridine.

6 Claims, 10 Drawing Sheets

(51) Int. Cl.

| | | |
|---|---|---|
| *H01M 2/16* | (2006.01) | |
| *H01M 4/04* | (2006.01) | |
| *H01M 4/1395* | (2010.01) | |
| *H01M 4/60* | (2006.01) | |
| *H01M 4/62* | (2006.01) | |
| *H01M 10/052* | (2010.01) | |
| *H01M 10/0562* | (2010.01) | |
| *H01M 4/02* | (2006.01) | |
| *H01M 10/054* | (2010.01) | |

(52) U.S. Cl.
CPC ....... *H01M 4/0471* (2013.01); *H01M 4/1395* (2013.01); *H01M 4/60* (2013.01); *H01M 4/622* (2013.01); *H01M 10/052* (2013.01); *H01M 10/0562* (2013.01); *H01M 10/054* (2013.01); *H01M 2004/027* (2013.01); *H01M 2004/028* (2013.01); *H01M 2220/30* (2013.01); *H01M 2300/0065* (2013.01); *H01M 2300/0068* (2013.01)

(58) Field of Classification Search
CPC .. H01M 10/052; H01M 4/622; H01M 2/1686; H01M 10/054; H01M 2300/0065; H01M 2220/30; H01M 2004/027; H01M 2004/028; H01M 2300/0068; C01B 32/194
See application file for complete search history.

(56) References Cited

U.S. PATENT DOCUMENTS

| | | |
|---|---|---|
| 8,952,490 B2 | 2/2015 | Kuriki et al. |
| 9,133,034 B2 | 9/2015 | Hou |
| 9,725,603 B2 | 8/2017 | Virtanen |
| 2012/0148924 A1 | 6/2012 | Ogino et al. |
| 2012/0242292 A1 | 9/2012 | Ogino |
| 2012/0288721 A1 | 11/2012 | Cho et al. |
| 2012/0330044 A1 | 12/2012 | Hou |
| 2014/0275597 A1 | 9/2014 | Zhang et al. |
| 2015/0183997 A1 | 7/2015 | Virtanen |
| 2016/0329533 A1 | 11/2016 | Tajima |
| 2016/0349905 A1 | 12/2016 | Momma et al. |
| 2016/0380271 A1 | 12/2016 | Ochiai et al. |
| 2017/0005364 A1 | 1/2017 | Yamazaki et al. |
| 2017/0256817 A1 | 9/2017 | Kadoma et al. |
| 2018/0076489 A1 | 3/2018 | Mikami et al. |

FOREIGN PATENT DOCUMENTS

| | | |
|---|---|---|
| CN | 103025654 A | 4/2013 |
| CN | 104508056 A | 4/2015 |
| DE | 10 2011 079 809 A1 | 11/2012 |
| EP | 2 864 426 | 4/2015 |
| JP | 05-314965 A | 11/1993 |
| JP | 05-314995 A | 11/1993 |
| JP | 2001-319692 A | 11/2001 |
| JP | 2005-038722 A | 2/2005 |
| JP | 2015-529610 | 10/2015 |
| JP | 2017-160113 A | 9/2017 |
| KR | 2012-0127074 A | 11/2012 |
| KR | 2014-0043069 A | 4/2014 |
| TW | 201226315 | 7/2012 |
| WO | WO 2011/082064 A1 | 7/2011 |
| WO | WO 2013/191809 A1 | 12/2013 |
| WO | WO 2018/104838 A1 | 6/2018 |

OTHER PUBLICATIONS

International Search Report re Application No. PCT/IB2017/054062, dated Sep. 5, 2017.

Written Opinion re Application No. PCT/IB2017/054062, dated Sep. 5, 2017.

* cited by examiner

8600

GRAPHENE COMPOUND, METHOD FOR FORMING GRAPHENE COMPOUND, AND POWER STORAGE DEVICE

TECHNICAL FIELD

One embodiment of the present invention relates to a graphene compound and a power storage device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

BACKGROUND ART

In recent years, a variety of power storage devices, for example, storage batteries such as lithium-ion storage batteries, lithium-ion capacitors, and air cells have been actively developed. In particular, demand for lithium-ion storage batteries with high output and high energy density has rapidly grown with the development of the semiconductor industry, for electronic devices, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion storage batteries are essential as rechargeable energy supply sources for today's information society.

However, general lithium-ion storage batteries each include an organic solvent which may catch fire at high temperatures as an electrolyte solution while having high energy density; thus, the lithium-ion storage batteries may generate heat, catch fire, or explode if a protection circuit which controls charge and discharge causes malfunction, a cell is damaged, or an internal short circuit occurs, for example. Such accidents are often reported.

An all-solid-state battery including not an electrolyte solution but a solid electrolyte has been researched as a battery that is less likely to cause such accidents. For example, a power storage device in which a polymer electrolyte having lithium ion conductivity is used as a solid electrolyte has been researched.

However, even in a lithium-ion storage battery including a polymer electrolyte, the battery characteristics might be significantly degraded when the temperature of the battery becomes low and the ionic conductivity is significantly decreased. For example, although polyethylene oxide (PEO) is known as a polymer that can be used for a lithium-ion storage battery (see Patent Document 1), the lithium-ion storage battery used at low temperatures may cause a problem of a decrease in the ionic conductivity. The melting point of PEO is approximately 60° C., and when PEO melts, a dangerous situation of a short circuit between electrodes may be caused; thus, PEO can be used only in a narrow temperature range.

REFERENCES

Patent Documents

[Patent Document 1] Japanese Published Patent Application No. 2005-38722

DISCLOSURE OF INVENTION

A solid electrolyte in an all-solid-state battery should have basic properties of high conductivity of ions that transfer electric charges and low conductivity of electrons in order to prevent an internal short circuit between a positive electrode and a negative electrode.

Since a power storage device is used under various environments, a solid electrolyte capable of exhibiting the above-mentioned basic properties even at high temperatures is needed in order to obtain a practical all-solid-state lithium-ion storage battery. That is, a solid electrolyte capable of withstanding high temperatures is needed. For example, a material having excellent heat resistance as well as the properties of a solid electrolyte such as polyethylene oxide (PEO) is needed.

In recent years, deformable electronic devices have been actively developed. In order to obtain such flexible electronic devices, components of the electronic devices also need to be deformable. Not only housings and displays but also power storage devices included in the electronic devices need to be flexible.

In order to obtain a flexible power storage device, components of the power storage device also need to be flexible; thus, a solid electrolyte also needs to be flexible. A ceramic solid electrolyte has been widely researched in addition to a polymer-based solid electrolyte such as PEO. Although the ceramic solid electrolyte tends to have higher ionic conductivity than the polymer-based solid electrolyte, the ceramic solid electrolyte is easily broken or is likely to be apart from an active material when being bent; thus, the ceramic solid electrolyte is not very suitable for the flexible power storage device.

In view of the above, an object of one embodiment of the present invention is to provide a material that can be used for a solid electrolyte of a power storage device. Another object is to provide a material having high ion conductivity. Another object is to provide a material having high dispersibility in a solvent. Another object is to provide a material that can be used in a wide temperature range. Another object is to provide a material that can withstand deformation. Another object is to provide a chemically modified graphene compound. Another object is to provide a novel graphene compound.

Another object of one embodiment of the present invention is to provide a power storage device that can be changed in shape, i.e., a flexible power storage device. Another object is to provide a novel power storage device having flexibility and including a novel graphene compound.

Note that the descriptions of these objects do not disturb the existence of other objects. In one embodiment of the present invention, there is no need to achieve all the objects. Other objects will be apparent from and can be derived from the description of the specification, the drawings, the claims, and the like.

In view of the above, one embodiment of the present invention is a graphene compound containing a substituted or unsubstituted chain group and a graphene layer. The chain group contains one or more ester groups or carboxyl groups.

The chain group contains a Si atom. The chain group is bonded to the graphene layer through the Si atom.

Another embodiment of the present invention is a graphene compound containing a substituted or unsubstituted chain group and a graphene layer. The chain group contains 1 to 10 ester groups or carboxyl groups. The chain group contains a Si atom. The chain group is bonded to the graphene layer through the Si atom.

Another embodiment of the present invention is a graphene compound containing a substituted or unsubstituted chain group and a graphene layer. The chain group contains one ester group or carboxyl group. The chain group contains a Si atom. The chain group is bonded to the graphene layer through the Si atom.

Another embodiment of the present invention is a graphene compound having a structure represented by a general formula (G1).

[Chemical Formula 1]

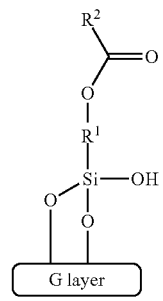

(G1)

In the general formula (G1), G layer represents a graphene layer, $R^1$ represents a substituted or unsubstituted alkyl group containing 1 to 20 carbon atoms, and $R^2$ represents hydrogen or a substituted or unsubstituted alkyl group containing 1 to 20 carbon atoms.

Another embodiment of the present invention is the graphene compound in the general formula (G1) in which $R^1$ represents a substituted or unsubstituted alkyl group containing 1 to 11 carbon atoms and $R^2$ represents a substituted or unsubstituted alkyl group containing 1 to 11 carbon atoms.

Another embodiment of the present invention is a graphene compound having a structure represented by a general formula (G2).

[Chemical Formula 2]

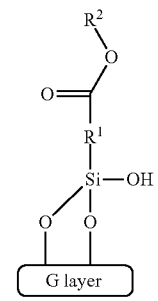

(G2)

In the general formula (G2), G layer represents a graphene layer, $R^1$ represents a substituted or unsubstituted alkyl group containing 1 to 20 carbon atoms, and $R^2$ represents hydrogen or a substituted or unsubstituted alkyl group containing 1 to 20 carbon atoms.

Another embodiment of the present invention is the graphene compound in general formula (G2), in which $R^1$ represents a substituted or unsubstituted alkyl group containing 1 to 11 carbon atoms and $R^2$ represents a substituted or unsubstituted alkyl group containing 1 to 11 carbon atoms.

Another embodiment of the present invention is a graphene compound having a structure represented by a structural formula (202).

[Chemical Formula 3]

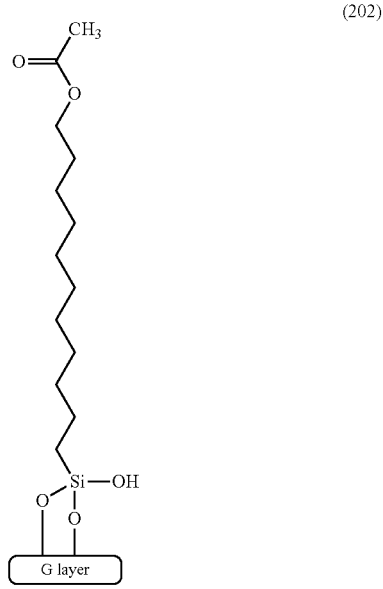

(202)

In the structural formula (202), G layer represents a graphene layer.

Another embodiment of the present invention is a graphene compound having a structure represented by a structural formula (203).

[Chemical Formula 4]

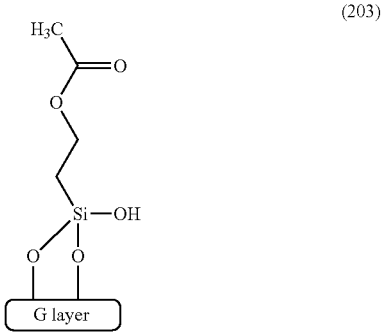

(203)

In the structural formula (203), G layer represents a graphene layer.

Another embodiment of the present invention is a graphene compound having a structure represented by a structural formula (204).

[Chemical Formula 5]

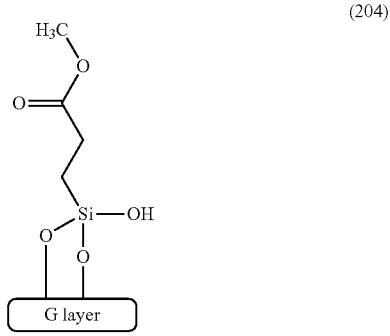

(204)

In the structural formula (204), G layer represents a graphene layer.

Another embodiment of the present invention is a power storage device including the above-described graphene compound, an exterior body, a positive electrode current collector, and a negative electrode current collector.

Another embodiment of the present invention is a method for forming a graphene compound, including the following steps: stirring graphene oxide and a Lewis base to form a first mixed solution, mixing a silicon compound that contains one or more ester groups or carboxyl groups into the first mixed solution and stirring the mixed solution to form a second mixed solution, and filtering the second mixed solution and collecting an obtained residue. The residue includes a graphene compound.

In the above-described method for forming a graphene compound, the Lewis base is preferably one or more of butylamine, pentylamine, hexylamine, diethylamine, dipropylamine, dibutylamine, triethylamine, tripropylamine, and pyridine.

Another embodiment of the present invention is a method for forming a graphene compound, including the following steps: stirring graphene oxide and butylamine to form a first mixed solution, mixing a silicon compound into the first mixed solution and stirring the mixed solution to form a second mixed solution, and filtering the second mixed solution and collecting an obtained residue. The silicon compound is one of 11-acetoxyundecyltrichlorosilane, 2-acetoxyethyltrichlorosilane, and 2-(carbomethoxy)ethyltrichlorosilane. The residue includes a graphene compound.

According to one embodiment of the present invention, a material that can be used for a solid electrolyte of a power storage device is provided. According to one embodiment of the present invention, a material having high ion conductivity is provided. According to one embodiment of the present invention, a material having high dispersibility in a solvent is provided. According to one embodiment of the present invention, a material that can be used in a wide temperature range is provided. According to one embodiment of the present invention, a material that can withstand deformation is provided. According to one embodiment of the present invention, a chemically modified graphene compound is provided. According to one embodiment of the present invention, a novel graphene compound is provided.

According to one embodiment of the present invention, a power storage device that can be changed in shape, i.e., a flexible power storage device is provided. According to one embodiment of the present invention, a novel power storage device having flexibility and including a novel graphene compound is provided.

Note that the description of these effects does not preclude the existence of other effects. One embodiment of the present invention does not necessarily achieve all the effects listed above. Other effects will be apparent from and can be derived from the description of the specification, the drawings, the claims, and the like.

BRIEF DESCRIPTION OF DRAWINGS

In the accompanying drawings.

BEST MODE FOR CARRYING OUT THE INVENTION

Figure 1A:
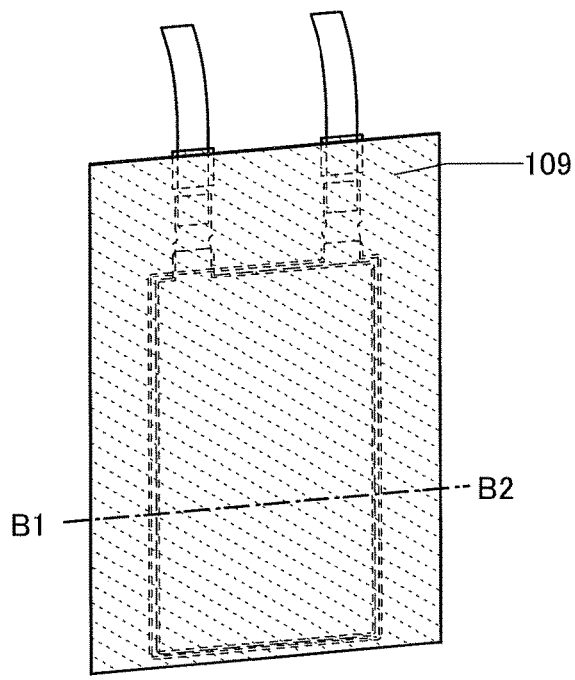
FIGS. 1A and 1B illustrate a lithium-ion storage battery.

Hereinafter, embodiments of the present invention will be described in detail with reference to the accompanying drawings. Note that the present invention is not limited to the description below, and it is easily understood by those skilled in the art that modes and details of the present invention can be modified in various ways. Furthermore, the present invention should not be construed as being limited to the description of the embodiments.

Note that in drawings described in this specification, the sizes, thicknesses, and the like of components such as a positive electrode, a negative electrode, an active material layer, a separator, and an exterior body are exaggerated for simplicity in some cases. Therefore, the sizes of the components are not limited to the sizes in the drawings and relative sizes between the components.

Note that the ordinal numbers such as "first", "second", and "third" in this specification and the like are used for convenience and do not denote the order of steps, the positional relation, or the like. Therefore, for example, description can be made even when "first" is replaced with "second" or "third", as appropriate. In addition, the ordinal numbers in this specification and the like are not necessarily the same as those which specify one embodiment of the present invention.

Note that in the structures of the present invention described in this specification and the like, the same portions or portions having similar functions in different drawings are denoted by the same reference numerals, and descriptions thereof are not repeated. Furthermore, the same hatching pattern is applied to portions having similar functions, and the portions are not especially denoted by reference numerals in some cases.

In this specification, flexibility refers to a property of an object being flexible and bendable. In other words, it is a property of an object that can be deformed in response to an external force applied to the object, and elasticity or restorability to the former shape is not taken into consideration. A flexible object can be deformed in response to an external force. A flexible object can be used with its shape fixed in a state of being deformed, can be used while repeatedly deformed, and can be used in a state of not deformed.

In this specification, chemical modification may refer to changing of a function or a property of a graphene compound by chemically changing the graphene compound. It may refer to addition of a functional group having a certain function or property.

The descriptions in embodiments for the present invention can be combined with each other as appropriate.

Embodiment 1

In this embodiment, a graphene compound formed according to one embodiment of the present invention is described. In addition, a method for forming a graphene compound by chemical modification is described. The graphene compound formed according to one embodiment of the present invention has a function of conducting metal ions such as lithium, sodium, magnesium, and calcium and thus can be used for a solid electrolyte of a lithium-ion storage battery, for example. However, one embodiment of the present invention is not limited thereto.

<Graphene Compound>

First, graphene and a graphene compound are described.

Graphene is a one-atom-thick sheet of carbon atoms having $sp^2$ hybrid orbitals which are bonded to each other and arranged to have a hexagonal lattice structure on a plane. Bonds between carbon atoms in graphene are stronger than those in diamond; thus, graphene has extremely high resistance to deformation and pulling. However, graphene has extremely high electron conductivity and is not sufficiently permeable to lithium ions; thus, graphene by itself is not suitable for a solid electrolyte of a lithium-ion storage battery.

Graphene containing carbon atoms arranged in one atomic layer is referred to as single-layer graphene in some cases. Graphene including two or more and one hundred or less layers is referred to as multilayer graphene in some cases. The length in the longitudinal direction or the length of the major axis in a plane in each of single-layer graphene and multilayer graphene is greater than or equal to 50 nm and less than or equal to 100 μm or greater than or equal to 800 nm and less than or equal to 50 μm. Note that graphene in this specification includes single-layer graphene and multilayer graphene.

In general, graphene has various kinds of defects in some cases. For example, a carbon atom forming a lattice may be missing or a five-membered ring or a seven-membered ring may exist in a lattice in addition to a six-membered ring in some cases. In addition, graphene may have a functional group containing carbon or an element other than carbon. Such a defect site can be utilized to bond graphene with an atom or an atomic group to obtain a desired property.

In this specification and the like, a compound including graphene as a basic skeleton is referred to as a graphene compound. Note that, in this specification, graphene compounds include single-layer graphene and multilayer graphene.

Graphene compounds are detailed below.

A graphene compound is, for example, a compound where graphene is chemically modified with an atom other than carbon or an atomic group with an atom other than a carbon atom. A graphene compound may be a compound where graphene is chemically modified with an atomic group composed mainly of carbon, such as an alkyl group or an alkylene group. An atomic group that chemically modifies graphene is referred to as a chemically modifying group, a modifying group, a substituent, a functional group, a characteristic group, or the like in some cases. Chemical modification in this specification and the like refers to introduction of an atomic group to graphene, multilayer graphene, a graphene compound, or graphene oxide (described later) by a substitution reaction, an addition reaction, or other reactions.

The chemical modification not only means introduction of one kind of atom or atomic group but also means introduction of two or more kinds of atoms or atomic groups by two or more types of chemical modification. The chemical modification includes an addition reaction of hydrogen, a halogen atom, a hydrocarbon group, an aromatic hydrocarbon group, or a heterocyclic compound group. Examples of a reaction of introducing an atomic group to graphene include an addition reaction and a substitution reaction. Alternatively, a Friedel-Crafts reaction, a Bingel reaction, or the like may be performed. A radical addition reaction may be performed on graphene, and a ring may be formed between graphene and an atomic group by a cycloaddition reaction.

Note that a front surface and a back surface of graphene may be chemically modified with different atoms or different atomic groups. In multilayer graphene, multiple layers may be chemically modified with different atoms or atomic groups.

An example of the above-mentioned graphene compound chemically modified with an atom or an atomic group is graphene chemically modified with oxygen or a functional group containing oxygen. A graphene compound chemically modified with oxygen or a functional group containing oxygen is referred to as graphene oxide in some cases. In this specification, graphene oxides include multilayer graphene oxides.

An example of graphene oxide is represented by a structural formula (300). Although the structural formula (300) shows an example in which a graphene layer (G layer) has an epoxy group, a hydroxy group, and a carboxy group, the kind and the number of functional groups of the graphene oxide are not limited to those of this example.

[Chemical Formula 6]

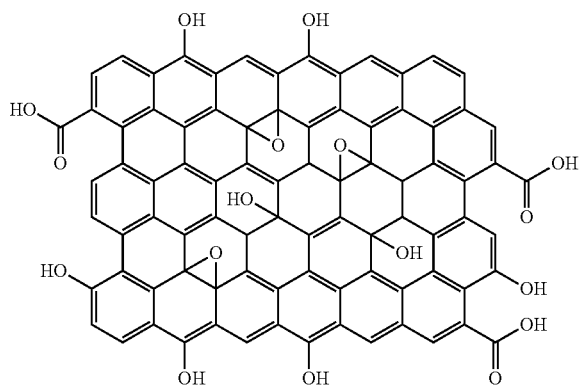

(300)

A simplified structure of graphene oxide is represented by a general formula (G3). A graphene layer is represented by G layer in the general formula (G3). The graphene layer is a sheet-like layer of carbon atoms bonded to each other. The graphene layer may be either a single layer or a multilayer and may include defects or functional groups. Hereinafter, the graphene oxide is described with the general formula (G3). Although the general formula (G3) shows an example in which the graphene layer has two hydroxy groups, the kind and the number of functional groups of the graphene layer of the present invention are not limited to those of this example.

[Chemical Formula 7]

(G3)

A formation method example of graphene oxide is described below. Graphene oxide can be obtained by oxidizing the aforementioned graphene or multilayer graphene. Alternatively, graphene oxide can be obtained by being separated from graphite oxide. Graphite oxide can be obtained by oxidizing graphite. The graphene oxide may be further chemically modified with the above-described atom or atomic group.

A compound that can be obtained by reducing graphene oxide is referred to as reduced graphene oxide (RGO) in some cases. In RGO, in some cases, all oxygen atoms contained in the graphene oxide are not extracted and part of them remains in a state of oxygen or an atomic group containing oxygen that is bonded to carbon.

A graphene compound may have a sheet-like shape where a plurality of graphene compounds partly overlap with each other. Such a graphene compound is referred to as a graphene compound sheet in some cases. The graphene compound sheet has, for example, an area with a thickness larger than or equal to 0.33 nm and smaller than or equal to 10 mm, preferably larger than or equal to 0.34 nm and smaller than or equal to 10 The graphene compound sheet may be chemically modified with an atom other than carbon, an atomic group containing an atom other than carbon, an atomic group composed mainly of carbon such as an alkyl group, or the like. A plurality of layers in the graphene compound sheet may be chemically modified with different atoms or atomic groups.

A graphene compound may have a five-membered ring composed of carbon atoms or a poly-membered ring that is a seven- or more-membered ring composed of carbon atoms, in addition to a six-membered ring composed of carbon atoms. In the neighborhood of a poly-membered ring that is a seven- or more-membered ring, a region through which a lithium ion can pass may be generated.

A plurality of graphene compounds may be gathered to form a sheet-like shape.

A graphene compound has a planar shape, thereby enabling surface contact.

<Chemically Modified Graphene Compound>

Next, a chemically modified graphene compound is described. A graphene compound formed by a formation method of one embodiment of the present invention can be used for a solid electrolyte of a lithium-ion storage battery, for example. In that case, the graphene compound needs to have an insulating property to prevent a short circuit between a positive electrode and a negative electrode. Note that the graphene compound of one embodiment of the present invention has conductivity to metal ions such as sodium, magnesium, and calcium in addition to lithium; thus, the graphene compound of one embodiment of the present invention can be used for applications other than a lithium-ion storage battery. In this embodiment, a power storage device including a lithium ion, which is a typical example of such metal ions, as a carrier is described; the description can also be used for a power storage device including another metal ion as a carrier.

Pure graphene is known to have high electron conductivity, and pure graphene by itself cannot be used for a solid electrolyte of a lithium-ion storage battery. Although graphene oxide has relatively low electron conductivity, it has low reduction resistance and thus is easily reduced to RGO having high electron conductivity. In order to provide graphene oxide or graphene with an insulating property stably, chemical modification is preferably used. For example, graphene oxide or graphene may be chemically modified with a molecule having an alkyl chain that has a relatively large number of carbon atoms. When both surfaces of a sheet-like graphene oxide are chemically modified with a compound having a long chain alkyl group, the distance between a plurality of sheets of graphene oxide is increased and electronic conduction is suppressed because the alkyl chain contains a functional group having low electron conductivity, so that an insulating property can be provided.

However, an alkyl group is a non-polar functional group and has a low affinity for lithium ions which cause a battery reaction in a lithium-ion storage battery. Thus, when graphene is chemically modified with a compound having a long chain alkyl group, the transfer of lithium ions is inhibited and accordingly a battery reaction is inhibited. In addition, a lithium salt is not easily dissociated. Accordingly, a lithium-ion storage battery including a graphene compound chemically modified with a compound having a long chain alkyl group as a solid electrolyte has poor output characteristics.

In view of the above, the graphene compound of one embodiment of the present invention has both an insulating property and an affinity for lithium ions. For example, it is preferable that the graphene compound be chemically modified to have a functional group such as an ester group or a carboxyl group. The ester group and the carboxyl group are classified into a hydrophilic group. The ester group and the carboxyl group each have an affinity for lithium ions owing to its polarity and contribute to the dissociation of a lithium salt and the transfer of lithium ions. Furthermore, when the graphene compound is used for a solid electrolyte of a lithium-ion storage battery, the number of ester groups and carboxyl groups in a functional group of the graphene compound is preferably large because the mobility of lithium ions is improved.

However, as the number of ester groups or carboxyl groups increases, the molecular weight of the graphene compound becomes large and the graphene compound becomes unlikely to be dissolved in a solvent; thus, reactivity of graphene or graphene oxide when chemically modified is reduced in some cases. In addition, as the number of ester groups increases, a hydrolysis reaction is likely to occur in some cases. Therefore, the number of ester groups or carboxyl groups is preferably 1 to 10.

The graphene compound of one embodiment of the present invention has, when used for a solid electrolyte, higher heat resistance than a polymer electrolyte. High heat resistance is especially important for a lithium-ion storage battery because when its component is damaged and an unexpected reaction occurs, a serious accident such as firing or explosion might occur. Low heat resistance of its component is a major problem when a lithium-ion storage battery is used in a severe environment, e.g., in a car. The graphene compound of one embodiment of the present invention can withstand a high-temperature environment because of its high heat resistance. Thus, the graphene compound of one embodiment of the present invention is suitably used for a solid electrolyte of a lithium-ion storage battery.

Another embodiment of the present invention is a graphene compound represented by the following general formula (G1) or (G2).

[Chemical Formula 8]

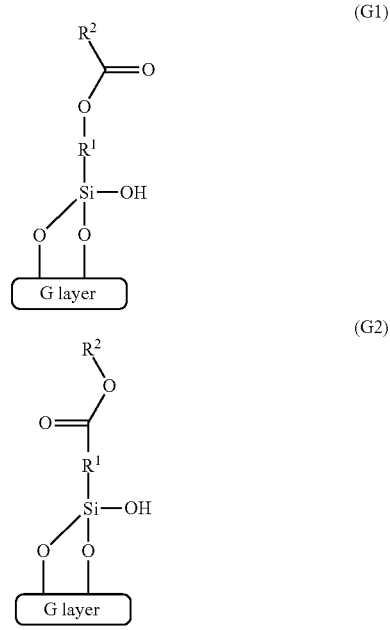

In each of the general formulas (G1) and (G2), G layer represents a graphene layer.

In each of the general formulas (G1) and (G2), $R^1$ represents a substituted or unsubstituted alkyl group and may be branched. $R^2$ represents hydrogen or a substituted or unsubstituted alkyl group and may be branched. The general formula (G1) is classified into esters because the general formula (G1) has an ester group. In the case where $R^2$ in the general formula (G2) is an alkyl group, the general formula (G2) is classified into esters because the general formula (G2) has an ester group. In the case where $R^2$ in the general formula (G2) is hydrogen, the general formula (G2) is classified into carboxylic acids because the general formula (G2) has a carboxyl group.

Note that substitution in the general formula (G1) or (G2) is preferably substitution by a substituent such as an alkyl group having 1 to 6 carbon atoms, e.g., a methyl group, an ethyl group, an n-propyl group, an iso-propyl group, a sec-butyl group, a tert-butyl group, an n-pentyl group, or an n-hexyl group, an aryl group having 6 to 10 carbon atoms, e.g., a phenyl group, an o-tolyl group, an m-tolyl group, a p-tolyl group, a 1-naphthyl group, or a 2-naphthyl group, fluorine, or trifluoromethane.

Alternatively, $R^1$ is preferably a substituted or unsubstituted alkyl group having 1 to 20 carbon atoms. $R^2$ is preferably hydrogen or a substituted or unsubstituted alkyl group having 1 to 20 carbon atoms. Interlayer distance in a chemically modified graphene compound may be larger than that in graphene or graphene oxide. As the interlayer distance increases, the electron conductivity becomes low; therefore, the chemically modified graphene compound is favorably used as a solid electrolyte to prevent a short circuit (an internal short circuit) between a positive electrode and a negative electrode. Alternatively, $R^1$ and $R^2$ may be selected as appropriate so that the interlayer distance with which desired electron conductivity is obtained is set.

Alternatively, $R^1$ is preferably a substituted or unsubstituted alkyl group having 1 to 11 carbon atoms. Alternatively, $R^2$ is preferably a substituted or unsubstituted alkyl group having 1 to 11 carbon atoms. In terms of dispersibility in a solvent and ionic conductivity, the graphene compound of the present invention is preferable as a material for a solid electrolyte of a lithium-ion storage battery.

There is no particular limitation on the molecular weight or molecular structure of graphene in the graphene compound of one embodiment of the present invention, and graphene in any size can be used. Accordingly, it is impossible to specify a molecular structure of the graphene compound of one embodiment of the present invention in detail and fully represent the molecular structure of the graphene compound of one embodiment of the present invention. Thus, the chemically modified graphene compound of one embodiment of the present invention might be practically specified by describing a formation method; for example, a graphene compound chemically modified with a silicon compound that has a substituted or unsubstituted group having one or more ester groups or carboxyl groups. In addition, it is impossible or impractical to specify the chemically modified graphene compound of one embodiment of the present invention without describing a formation method, in some cases. Furthermore, although a graphene layer and Si are fixed in the shape of the graphene layer with two Si—O bonds in the above formula, the number of the Si—O bonds may be one or three. The bond is not limited to the Si—O bond, and another bond may be used. A hydroxy group or an alkoxy group may be bonded to a Si atom that is not bonded to the graphene layer.

<Chemical Modification>

Next, a method for chemically modifying graphene or graphene oxide is described using the following synthesis schemes (A-1) and (A-2).

[Chemical Formula 9]

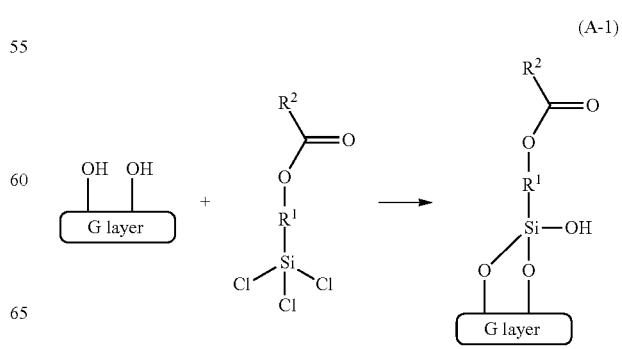

(A-1)

[Chemical Formula 10]

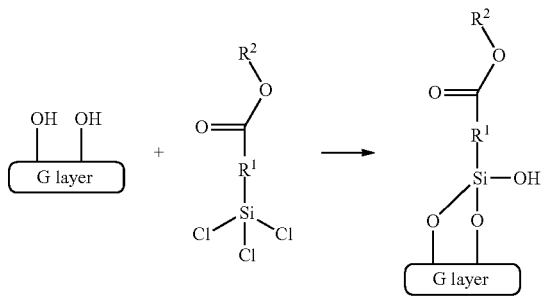

(A-2)

In each of the synthesis schemes (A-1) and (A-2), G layer represents a graphene layer.

As shown in each of the synthesis schemes (A-1) and (A-2), a silicon compound having one or more ester groups or carboxyl groups is reacted with graphene or graphene oxide in the presence of a Lewis base, whereby a chemically modified objective compound can be obtained. Such a reaction is referred to as silylation in some cases.

Silylation means the substitution of a silicon atom for a hydrogen atom in a hydroxy group, an amino group, a carboxyl group, an amide group, a mercapto group, or the like. A silicon compound used for silylation is referred to as a silylating agent in some cases.

As the Lewis base, alkylamine or a heterocyclic aromatic compound is used. Specifically, one or more of butylamine, pentylamine, hexylamine, diethylamine, dipropylamine, dibutylamine, triethylamine, tripropylamine, and pyridine is used.

In addition, the reaction is preferably performed under an inert gas atmosphere of nitrogen or a rare gas such as argon. The atmosphere of nitrogen or argon is preferable because hydrolysis of the silicon compound, oxidation of the Lewis base, or the like can be prevented. The atmosphere of the reaction is not limited to nitrogen or argon and may be an air atmosphere, for example.

In each of the synthesis schemes (A-1) and (A-2), $R^1$ represents a substituted or unsubstituted alkyl group and may be branched. $R^2$ represents hydrogen or a substituted or unsubstituted alkyl group and may be branched.

Alternatively, R' is preferably a substituted or unsubstituted alkyl group having 1 to 20 carbon atoms. Alternatively, $R^2$ is preferably hydrogen or a substituted or unsubstituted alkyl group having 1 to 20 carbon atoms.

Alternatively, $R^1$ is preferably a substituted or unsubstituted alkyl group having 1 to 11 carbon atoms. Alternatively, $R^2$ is preferably a substituted or unsubstituted alkyl group having 1 to 11 carbon atoms.

Examples of a Lewis base that can be used in each of the synthesis schemes (A-1) and (A-2) include, but are not limited to, organic bases such as butylamine, pentylamine, hexylamine, diethylamine, dipropylamine, dibutylamine, triethylamine, tripropylamine, and pyridine.

Examples of a solvent that can be used in each of the synthesis schemes (A-1) and (A-2) include, but are not limited to, aromatic hydrocarbons such as toluene, xylene, and mesitylene; hydrocarbons such as hexane and heptane; and ether such as ethylene glycol dimethyl ether. It is particularly preferable to use primary amine as a Lewis base and an aromatic hydrocarbon as a solvent.

Instead of the silicon compound shown in each of the synthesis schemes (A-1) and (A-2), an agent having a trialkoxysilyl group may be used. However, the present invention is not limited thereto.

Specific Example

Here, examples of a silicon compound that has a chain group having one or more ester groups or carboxyl groups are shown below. With the use of any of such silicon compounds, a graphene compound chemically modified with a chain group having one or more ester groups or carboxyl groups can be formed. Compounds 100 to 149 and compounds 156 to 161, which have ester groups, are classified into esters. Compounds 150 to 155, which have carboxyl groups, are classified into carboxylic acids.

[Chemical Formula 11]

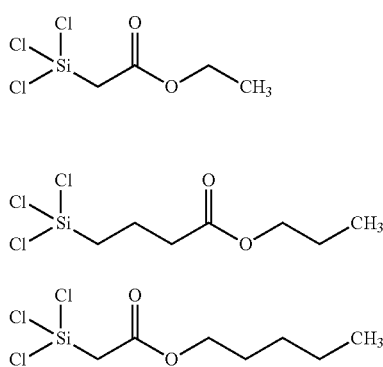

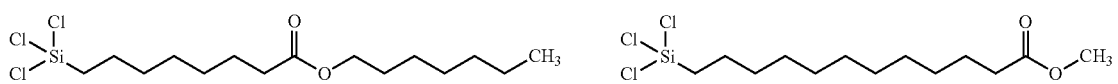

-continued
(108)
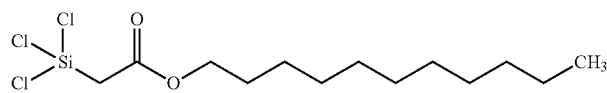
(109)
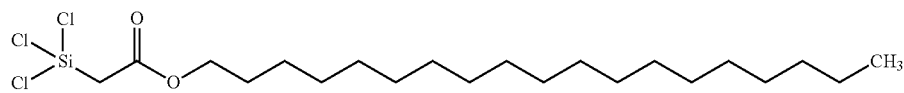
(110)
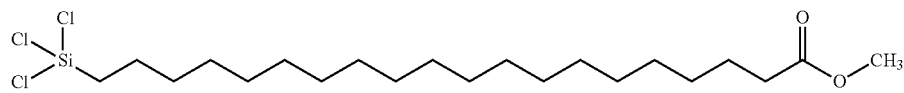
[Chemical Formula 12]
(111)
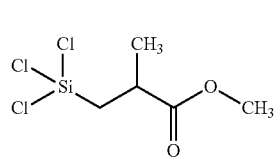
(112)
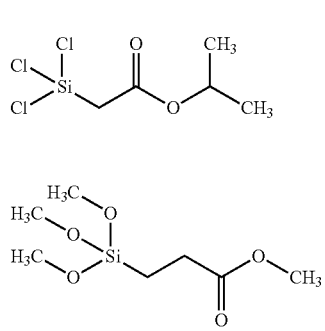
(113)
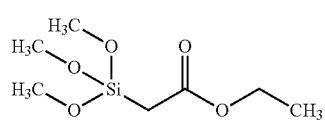
(114)
(115)
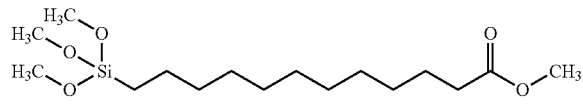
(116)
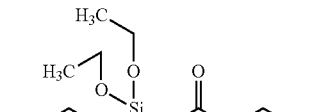
(117)
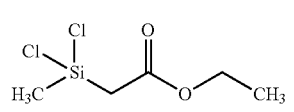
(118)
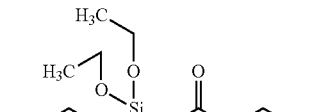
(119)
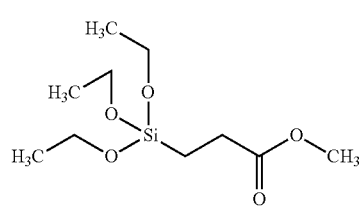
(120)
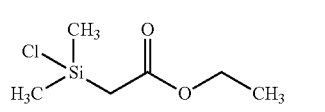
(121)
(122)
(123)
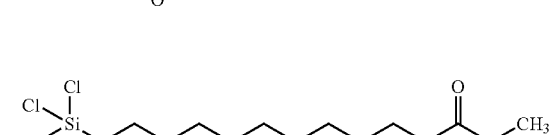
(124)
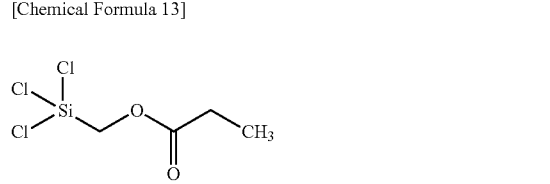
[Chemical Formula 13]
(125)
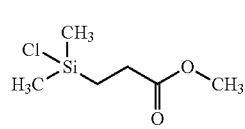
(126)
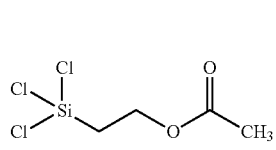

-continued
(127) 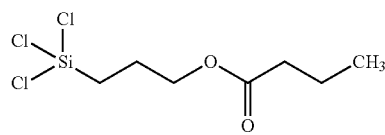
(128) 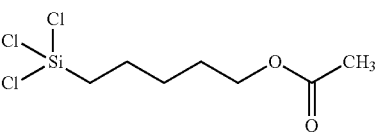
(129) 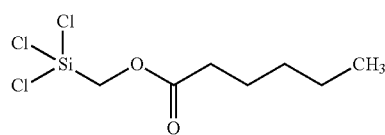
(130) 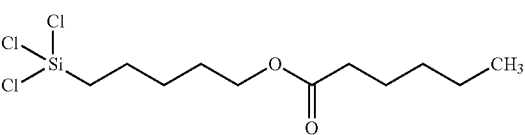
(131) 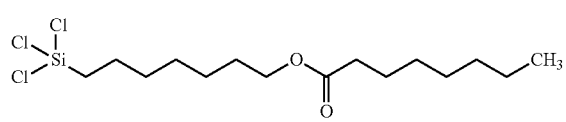
(132) 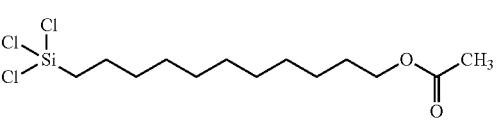
(133) 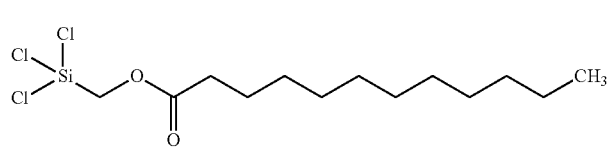
(134) 
(135) 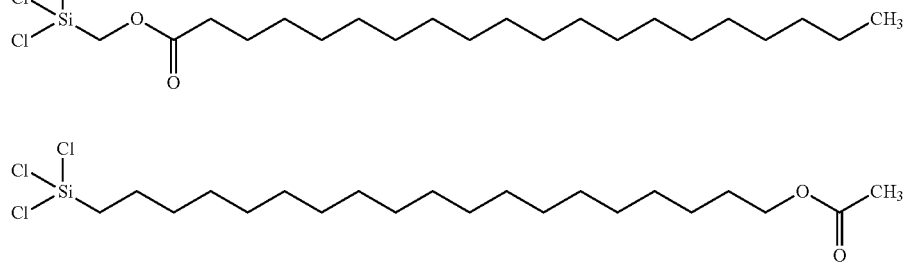
[Chemical Formula 14]
(136) 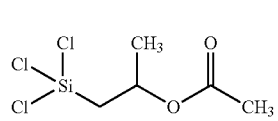
(137) 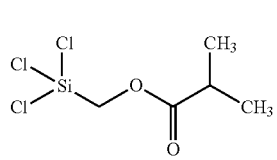
(138) 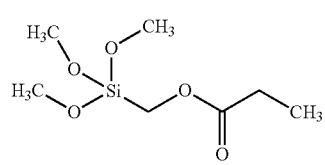
(139) 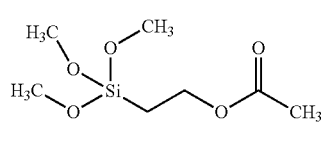
(140) 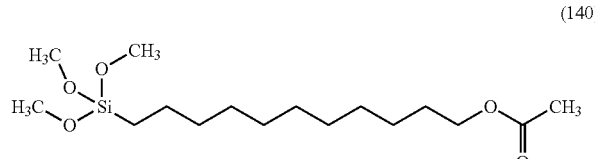
(141) 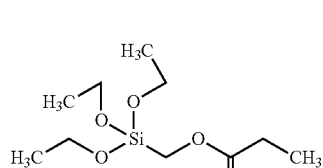
(142) 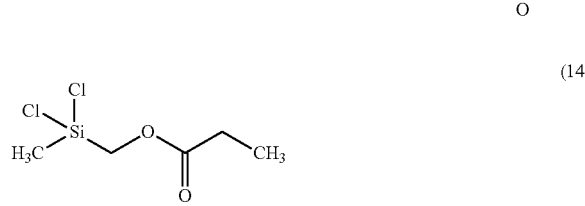
(143) 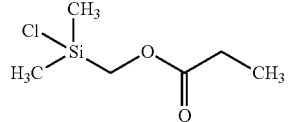

-continued

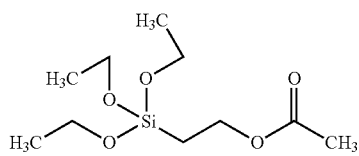 (144)

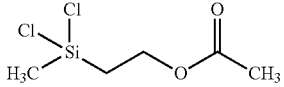 (145)

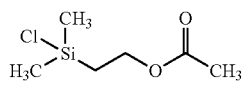 (146)

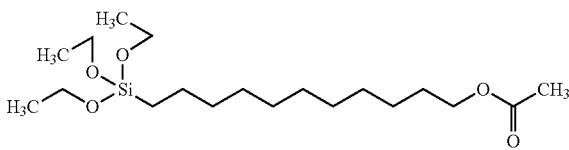 (147)

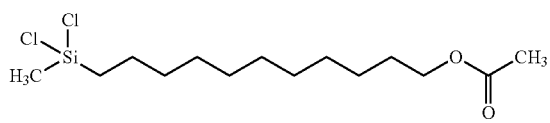 (148)

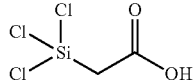 (149)

[Chemical Formula 15]

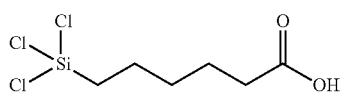 (150)

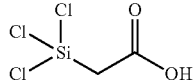 (151)

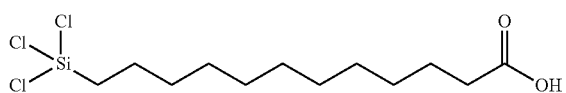 (152)

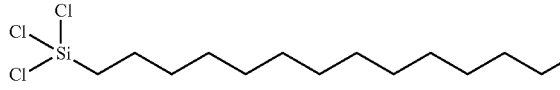 (153)

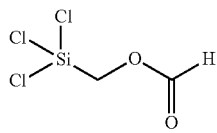 (154)

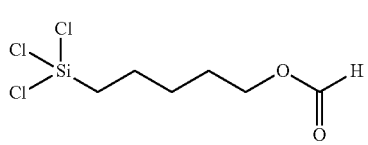 (155)

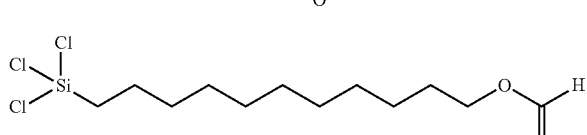 (156)

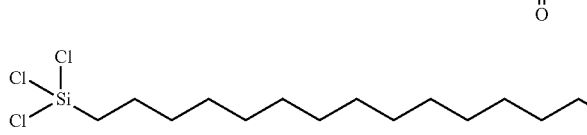 (157)

 (158)

 (159)

(160)

(161)

With the use of any of the above silicon compounds, the graphene compound that has a chain group having one or more ester groups or carboxyl groups can be formed. The graphene compound chemically modified with any of these silicon compounds has low electron conductivity and high lithium ion conductivity and thus is favorably used for a solid electrolyte or a separator of a lithium-ion storage battery. Note that the graphene compound of one embodiment of the present invention may be formed without using any of the above-mentioned silicon compounds.

In this embodiment, one embodiment of the present invention has been described. Other embodiments of the present invention are described in other embodiments. Note that one embodiment of the present invention is not limited thereto. For example, although an example of the graphene compound that has a chain group having one or more ester groups or carboxyl groups is described as one embodiment of the present invention, one embodiment of the present invention is not limited to this example.

This embodiment can be combined with any of the other embodiments as appropriate.

Embodiment 2

In this embodiment, a structure of a lithium-ion storage battery is described as a power storage device including the graphene compound of one embodiment of the present invention.

Figure 1B:
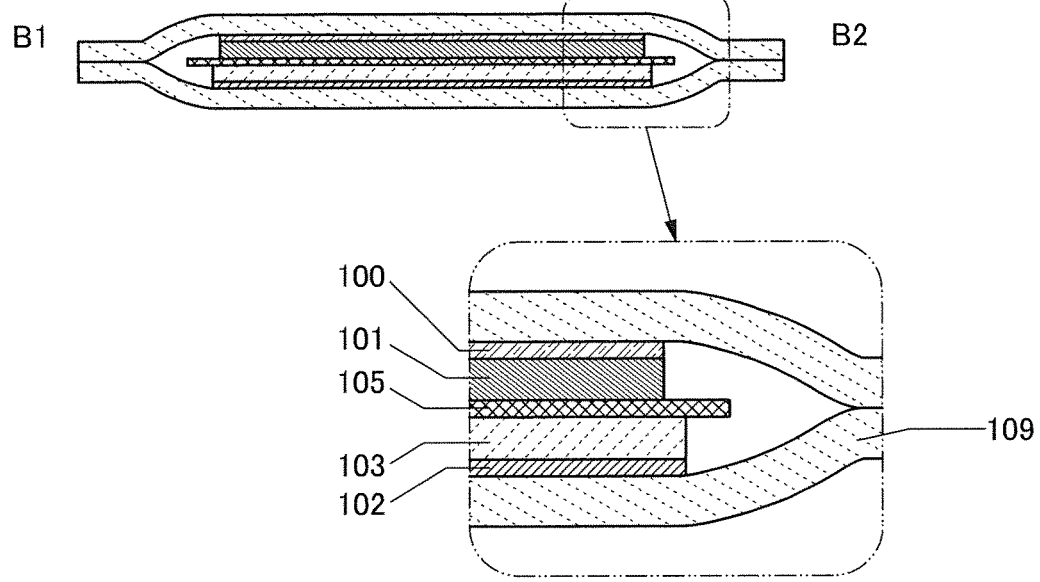

A method for forming a lithium-ion storage battery 110 of one embodiment of the present invention is described below with reference to FIGS. 1A and 1B. FIG. 1A is an external view of the lithium-ion storage battery 110. FIG. 1B is a cross-sectional view taken along dashed-dotted line B1-B2 in FIG. 1A. FIG. 1B is also a schematic cross-sectional view in which a positive electrode current collector 100, a positive electrode active material layer 101, a graphene compound 105 that is a solid electrolyte layer, a negative electrode active material layer 103, and a negative electrode current collector 102 are stacked and enclosed by an exterior body 109. Note that the active material layers can be formed on both surfaces of the current collector, and the lithium-ion storage battery can have a stacked-layer structure.

<<Structure of Positive Electrode>>

The positive electrode is described. The positive electrode includes the positive electrode active material layer 101 and the positive electrode current collector 100.

As the positive electrode active material used for the positive electrode active material layer 101, a material into and from which carrier ions such as lithium ions can be inserted and extracted can be used. Examples of the material include a lithium-containing material with an olivine crystal structure, a layered rock-salt crystal structure, and a spinel crystal structure.

Typical examples of the lithium-containing material with an olivine crystal structure (general formula: LiMPO$_4$ (M is Fe(II), Mn(II), Co(II), or Ni(II))) include LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<1, and 0<i<1).

For example, lithium iron phosphate (LiFePO$_4$) is preferable because it properly has properties necessary for the positive electrode active material, such as safety, stability, high capacity density, high potential, and the existence of lithium ions which can be extracted in initial oxidation (charging).

Examples of the lithium-containing material with a layered rock-salt crystal structure include lithium cobalt oxide (LiCoO$_2$), LiNiO$_2$, LiMnO$_2$, Li$_2$MnO$_3$, an NiCo-containing material (the general formula thereof is LiNi$_x$Co$_{1-x}$O$_2$ (0<x<1)) such as LiNi$_{0.8}$Co$_{0.2}$O$_2$, an NiMn-containing material (the general formula thereof is LiNi$_x$Mn$_{1-x}$O$_2$ (0<x<1)) such as LiNi$_{0.5}$Mn$_{0.5}$O$_2$, and an NiMnCo-containing material (also referred to as NMC, and the general formula thereof is LiNi$_x$Mn$_y$Co$_{1-x-y}$O$_2$ (x>0, y>0, x+y<1)) such as LiNi$_{1/3}$Mn$_{1/3}$Co$_{1/3}$O$_2$. Moreover, Li(Ni$_{0.8}$Co$_{0.15}$Al$_{0.05}$)O$_2$, Li$_2$MnO$_3$—LiMO$_2$ (M=Co, Ni, or Mn), and the like can be given.

In particular, LiCoO$_2$ is preferable because it has high capacity and higher stability in the air and higher thermal stability than LiNiO$_2$, for example.

Examples of the lithium-containing material with a spinel crystal structure include LiMn$_2$O$_4$, Li$_{1+x}$Mn$_{2-x}$O$_4$ (0<x<2), LiMn$_{2-x}$Al$_x$O$_4$ (0<x<2), and LiMn$_{1.5}$Ni$_{0.5}$O$_4$.

It is preferred that a small amount of lithium nickel oxide (LiNiO$_2$ or LiNi$_{1-x}$M$_x$O$_2$ (M=Co, Al, or the like), (0<x<1)) be added to the lithium-containing material with a spinel crystal structure that contains manganese, such as LiMn$_2$O$_4$, in which case the dissolution of manganese and the decomposition of an electrolyte can be suppressed, for example.

A composite oxide represented by a general formula Li$_{(2-j)}$MSSiO$_4$ (M is Fe(II), Mn(II), Co(II), or Ni(II), 0≤j≤2) can also be used as the positive electrode active material. Typical examples of Li$_{(2-j)}$MSiO$_4$ (general formula) are Li$_{(2-j)}$FeSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a nasicon compound represented by A$_x$M$_2$(XO$_4$)$_3$ (general formula) (A=Li, Na, or Mg, M=Fe, Mn, Ti, V, Nb, or Al, X=S, P, Mo, W, As, or Si) can be used as the positive electrode active material. Examples of the nasicon compound are Fe$_2$(MnO$_4$)$_3$, Fe$_2$(SO$_4$)$_3$, and Li$_3$Fe$_2$(PO$_4$)$_3$. Further alternatively, for example, a compound represented by Li$_2$MPO$_4$F, Li$_2$MP$_2$O$_7$, or Li$_5$MO$_4$ (general formula) (M=Fe or Mn), a perovskite fluoride such as NaFeF$_3$ and FeF$_3$, a metal chalcogenide (a sulfide, a selenide, or a telluride) such as TiS$_2$ and MoS$_2$, a lithium-containing material with an inverse spinel structure such as LiMVO$_4$, vanadium oxide (V$_2$O$_5$, V$_6$O$_{13}$, LiV$_3$O$_8$, or the like), manganese oxide, or an organic sulfur compound can be used as the positive electrode active material.

In the case where carrier ions are alkali metal ions other than lithium ions or alkaline-earth metal ions, the following may be used as the positive electrode active material: a compound or an oxide which is obtained by substituting an alkali metal (e.g., sodium or potassium) or an alkaline-earth metal (e.g., calcium, strontium, barium, beryllium, or magnesium) for lithium in any of the aforementioned compounds or oxides. For example, the positive electrode active material may be a layered oxide containing sodium such as NaFeO$_2$ or Na$_{2/3}$[Fe$_{1/2}$Mn$_{1/2}$]O$_2$.

Further alternatively, any of the aforementioned materials may be combined to be used as the positive electrode active material. For example, a solid solution obtained by combining two or more of the aforementioned materials can be used as the positive electrode active material. For example, a solid solution of LiCo$_{1/3}$Mn$_{1/3}$Ni$_{1/3}$O$_2$ and Li$_2$MnO$_3$ can be used as the positive electrode active material.

The average particle diameter of primary particles of the positive electrode active material is preferably greater than or equal to 50 nm and less than or equal to 100 μm.

The positive electrode active material and a negative electrode active material have a main role in battery reactions of the power storage device, and receive and release carrier ions. To increase the lifetime of the power storage device, a material that has a small amount of capacity relating to irreversible battery reactions and has high charge and discharge efficiency is preferably used for the active materials.

The active material is in contact with an electrolyte. When the active material reacts with the electrolyte, the active material is lost and deteriorates by the reaction, which decreases the capacity of the power storage device. Therefore, it is preferable that such a reaction not be caused in the power storage device so that the power storage device hardly deteriorates.

Examples of the conductive additive of the electrode include acetylene black (AB), graphite (black lead) particles, carbon nanotubes, graphene, and fullerene.

A network for electronic conduction can be formed in the electrode by the conductive additive. The conductive additive also allows maintaining of a path for electronic conduction between the positive electrode active materials. The addition of the conductive additive to the positive electrode active material layer increases the electronic conductivity of the positive electrode active material layer 101.

A typical example of the binder is polyvinylidene fluoride (PVDF), and other examples of the binder include polyimide, polytetrafluoroethylene, polyvinyl chloride, ethylene-propylene-diene polymer, fluorine rubber, polymethyl methacrylate, polyethylene, and nitrocellulose.

The content of the binder in the positive electrode active material layer 101 is preferably greater than or equal to 0.5 wt % and less than or equal to 10 wt %, further preferably greater than or equal to 2 wt % and less than or equal to 8 wt %, and still further preferably greater than or equal to 3 wt % and less than or equal to 5 wt %. The content of the conductive additive in the positive electrode active material layer 101 is preferably greater than or equal to 1 wt % and less than or equal to 10 wt %, further preferably greater than or equal to 1 wt % and less than or equal to 5 wt %.

In the case where the positive electrode active material layer 101 is formed by a coating method, the positive electrode active material, the binder, the conductive additive, and a dispersion medium are mixed to form an electrode slurry, and the electrode slurry is applied to the positive electrode current collector 100 and dried.

The positive electrode active material layer 101 may be formed into a thin film by a sputtering method or the like.

The positive electrode current collector 100 can be formed using a material which has high electronic conductivity such as stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, and nickel. The positive electrode current collector can have a foil-like shape, a plate-like shape (sheet-like shape), a net-like shape, a punching-metal shape, an expanded-metal shape, or the like as appropriate.

Through the above steps, the positive electrode of the lithium-ion storage battery can be formed.

<<Structure of Negative Electrode>>

Next, the negative electrode is described. The negative electrode includes the negative electrode active material layer 103 and the negative electrode current collector 102. Steps of forming the negative electrode are described below.

Examples of a carbon-based material as the negative electrode active material used for the negative electrode active material layer 103 include graphite, graphitizing carbon (soft carbon), non-graphitizing carbon (hard carbon), a carbon nanotube, graphene, and carbon black. Examples of graphite include artificial graphite such as meso-carbon microbeads (MCMB), coke-based artificial graphite, or pitch-based artificial graphite and natural graphite such as spherical natural graphite. In addition, examples of the shape of graphite include a flaky shape and a spherical shape.

Other than the carbon-based material, a material that enables charge-discharge reactions by an alloying reaction and a dealloying reaction with lithium can be used as the negative electrode active material. For example, a material containing at least one of Ga, Si, Al, Ge, Sn, Pb, Sb, Bi, Ag, Zn, Cd, In, and the like can be used. Such elements have a higher capacity than carbon. In particular, silicon is preferably used because of its high theoretical capacity of 4200 mAh/g. Examples of the alloy-based material containing such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{(3-x)}M_xN$ (M is Co, Ni, or Cu) with a $Li_3N$ structure, which is a nitride containing lithium and a transition metal, can be used. For example, $Li_{2.6}Co_{0.4}N_3$ is preferable because of its high charge and discharge capacity (900 mAh/g and 1890 mAh/cm$^3$).

When a nitride containing lithium and a transition metal is used, lithium is contained in the negative electrode active material and thus the negative electrode active material can be used in combination with a material for a positive electrode active material that does not contain lithium, such as $V_2O_5$ or $Cr_3O_8$. In the case of using a material containing lithium as a positive electrode active material, the nitride containing lithium and a transition metal can be used for the negative electrode active material by extracting lithium contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The particle diameter of the negative electrode active material is preferably greater than or equal to 50 run and less than or equal to 100 μm, for example.

Note that a plurality of materials for active materials can be combined at a given proportion both for the positive electrode active material layer 101 and the negative electrode active material layer 103. The use of a plurality of materials for the active material layer makes it possible to select the property of the active material layer in more detail.

Examples of the conductive additive in the electrode include acetylene black (AB), graphite (black lead) particles, carbon nanotubes, graphene, and fullerene.

A network for electronic conduction can be formed in the electrode by the conductive additive. The conductive additive also allows maintaining of a path for electronic conduction between the negative electrode active materials. The addition of the conductive additive to the negative electrode active material layer increases the electronic conductivity of the negative electrode active material layer 103.

A typical example of the binder is polyvinylidene fluoride (PVDF), and other examples of the binder include polyimide, polyvinyl chloride, ethylene-propylene-diene polymer, styrene-butadiene rubber, sodium carboxymethyl cellulose, acrylonitrile-butadiene rubber, fluorine rubber, polyvinyl acetate, polymethyl methacrylate, polyethylene, and nitrocellulose.

The content of the binder in the negative electrode active material layer 103 is preferably greater than or equal to 1 wt % and less than or equal to 10 wt %, further preferably greater than or equal to 2 wt % and less than or equal to 8 wt %, and still further preferably greater than or equal to 3 wt % and less than or equal to 5 wt %. The content of the conductive additive in the negative electrode active material layer 103 is preferably greater than or equal to 1 wt % and less than or equal to 10 wt %, further preferably greater than or equal to 1 wt % and less than or equal to 5 wt %.

Next, the negative electrode active material layer 103 is formed over the negative electrode current collector 102. In the case where the negative electrode active material layer 103 is formed by a coating method, the negative electrode active material, the binder, the conductive additive, and a dispersion medium are mixed to form a slurry, and the slurry is applied to the negative electrode current collector 102 and dried. If necessary, pressing may be performed after the drying.

The negative electrode active material layer 103 may be formed into a thin film by a sputtering method or the like.

The negative electrode current collector 102 can be formed using a material which has high electronic conductivity and is not alloyed with a carrier ion of lithium or the like, such as stainless steel, gold, platinum, iron, copper, titanium, or tantalum, or an alloy thereof. Alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, and nickel. The negative electrode current collector 102 can have a foil-like shape, a plate-like shape (sheet-like shape), a net-like shape, a cylindrical shape, a coil shape, a punching-metal shape, an expanded-metal shape, or the like as appropriate. The negative electrode current collector 102 preferably has a thickness greater than or equal to 5 μm and less than or equal to 30 μm. Part of the surface of the electrode current collector may be provided with an undercoat layer using graphite or the like. In the case where a high-potential material such as lithium titanium oxide ($Li_4Ti_5O_{12}$) is used for the negative electrode active material, aluminum can be used for the negative electrode current collector 102.

Through the above steps, the negative electrode of the lithium-ion storage battery can be formed.

<<Structure of Solid Electrolyte Layer>>

In the case of using the graphene compound of one embodiment of the present invention for a solid electrolyte layer, the graphene compound may be mixed with a lithium salt.

For example, a dispersion liquid obtained by dispersing the graphene compound of one embodiment of the present invention in tetrahydrofuran (THF) and a solution obtained by dispersing a lithium salt in THE are mixed. Next, one or several drops of the mixed solution are dripped into a material of a solid electrolyte layer, the material is simply dried using a hot plate, and then drying is performed at 90° C. under reduced pressure to form the solid electrolyte layer. The solid electrolyte layer is in a film form in some cases. The solid electrolyte layer is provided between the positive electrode and the negative electrode and stored in the exterior body.

The graphene compound of one embodiment of the present invention has high dispersibility in a solvent because of having a functional group such as an ester group or a carboxyl group. Owing to the high dispersibility in a solvent, the solid electrolyte layer is easily formed into a film by the aforementioned method.

As the lithium salt, for example, one or more of $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, $LiN(C_2F_5SO_2)_2$, and the like can be used.

Note that a method for mixing the lithium salt with the graphene compound, which is employed in the case of using the graphene compound of one embodiment of the present invention for a solid electrolyte layer, is not limited thereto.

Alternatively, a mixture of the graphene compound to which the lithium salt is mixed and one or more of an oxide-based solid electrolyte, a sulfide-based solid electrolyte, and a polymer electrolyte may be used as the solid electrolyte layer.

As the oxide-based solid electrolyte, for example, one or more of $La_{0.51}Li_{0.34}TiO_{2.94}$, $Li_{1.3}Al_{0.3}Ti_{1.7}(PO_4)_3$, $Li_7La_3Zr_2O_{12}$, $50Li_4SiO_4 \cdot 50Li_3BO_3$, $Li_{2.9}PO_{3.3}N_{0.46}$, $Li_{3.6}Si_{0.6}P_{0.4}O_4$, $Li_{1.07}Al_{0.69}Ti_{1.46}(PO_4)_3$, $Li_{1.5}Al_{0.5}Ge_{1.5}(PO_4)_3$, and the like can be used.

As the sulfide-based solid electrolyte, for example, one or more of $Li_{10}GeP_2S_{12}$, $Li_{3.25}Ge_{0.25}P_{0.75}S_4$, $30Li_2S \cdot 26B_2S_3 \cdot 44LiI$, $63Li_2S \cdot 36SiS_2 \cdot 1Li_3PO_4$, $57Li_2S \cdot 38SiS_2 \cdot 5Li_4SiO_4$, $70Li_2S \cdot 30P_2S_5$, $50Li_2S \cdot 50GeS_2$, $Li_7P_3S_{11}$, $Li_{3.25}P_{0.95}S_4$, and the like can be used.

As the polymer electrolyte, for example, one or more of polyethylene oxide, polypropylene oxide, polyethyleneimine, and the like can be used. The polymer electrolyte in which a lithium salt is dissolved can also be used.

The solid electrolyte layer may include a plurality of layers. That is, a first solid electrolyte layer and a second solid electrolyte layer which are formed by different methods can be used together in the power storage device. The first solid electrolyte layer and the second solid electrolyte layer may be formed by the same method.

Furthermore, the power storage device may be flexible. In the case where flow stress is applied to the flexible power storage device, the stress can be relieved because the first solid electrolyte layer and the second solid electrolyte layer slide at the interface therebetween. Therefore, the structure including a plurality of layers is also suitable as a structure of the solid electrolyte layer in the flexible power storage device.

<<Structure of Separator>>

A separator is described. The separator needs to have an insulation property that prevents connection between the electrodes and ionic conductivity.

A solid electrolyte layer of a solid-state battery may also function as a separator. As a material for the separator, a graphene compound of one embodiment of the present invention that is to be the solid electrolyte layer can be used (see FIG. 1B).

In addition to the graphene compound that is to be the solid electrolyte layer, a separator may also be used. As a material for the separator, high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, nonwoven fabric, and a glass fiber can be used either alone or in combination. By using two separators having different characteristics in combination, the performance of the separators of the power storage device can be selected more variously than in the case of using one of the separators.

To incorporate the solid electrolyte layer and the separator in the power storage device, a method in which the solid electrolyte layer and the separator are inserted between the positive electrode and the negative electrode can be used. Alternatively, after the solid electrolyte layer and the separator are placed on one of the positive electrode and the negative electrode, the other of the positive electrode and the negative electrode can be stacked thereon. The positive electrode, the negative electrode, the solid electrolyte layer, and the separator are stored in the exterior body, whereby the power storage device can be fabricated.

Figure 2:
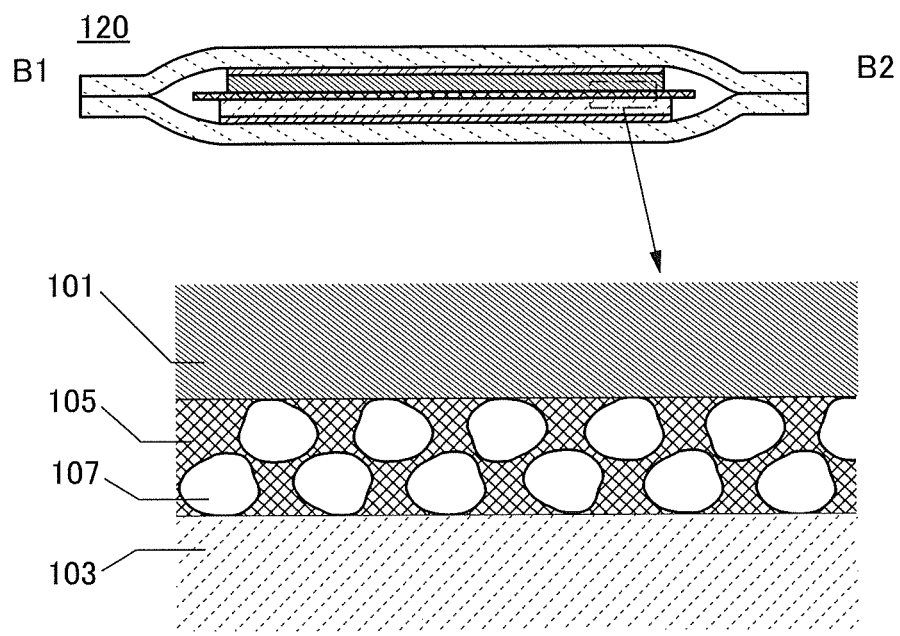
FIG. 2 illustrates a lithium-ion storage battery.

A schematic view of a lithium-ion storage battery 120 including a solid electrolyte layer and separators is illustrated in FIG. 2. FIG. 2 is an enlarged view of the positive electrode active material layer 101, the negative electrode active material layer 103, a graphene compound 105 that is a solid electrolyte layer, and separators 107. The graphene compound 105 that is a solid electrolyte layer and the separators 107 are provided between the positive electrode active material layer 101 and the negative electrode active material layer 103. The graphene compound 105 that is a solid electrolyte layer fills gaps between fibers of the separators 107 and is in contact with the positive electrode active material layer 101 and the negative electrode active material layer 103. Such a structure is preferable because a short circuit between the positive electrode and the negative electrode is prevented more effectively. Although the separator having a fiber-like shape is described as an example, the shape of the separator is not limited thereto.

The solid electrolyte layer and the separator with a size large enough to cover each surface of either the positive electrode or the negative electrode, in a form of sheet or envelope, may be fabricated to form the electrode wrapped in the solid electrolyte layer and the separator. In that case, the electrode can be protected from mechanical damages in the fabrication of the power storage device, which facilitates the handling of the electrode. The electrode wrapped in the solid electrolyte layer and the separator and the other electrode are provided in the exterior body, whereby the power storage device can be fabricated.

The separator 107 and the graphene compound 105 may each include a plurality of layers. For example, a first separator, a graphene compound that is a first solid electrolyte layer, a second separator, and a graphene compound that is a second solid electrolyte layer may be stacked in this order. When the stacked structure is used, the graphene compound 105 that is a solid electrolyte layer may fill gaps between fibers of the separators 107 and may be in contact with the positive electrode active material layer 101 and the negative electrode active material layer 103.

Furthermore, the power storage device may be flexible. In the case where flow stress is applied to the flexible power storage device, the stress can be relieved because the first separator and the second separator slide at the interface therebetween. Therefore, the structure including a plurality of separators is also suitable as a structure of the separator in the flexible power storage device.

Through the above steps, the separator can be incorporated in the lithium-ion storage battery.

<<Structure of Exterior Body>>

Next, the exterior body 109 is described. As the exterior body 109, a film having a three-layer structure formed as follows can be used; for example, a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film. With such a three-layer structure, permeation of the electrolyte and a gas can be blocked and an insulating property and resistance to the electrolyte can be obtained. The resistance to the electrolyte means corrosion resistance to the electrolyte. The exterior body is folded inwardly with one portion overlapping with another portion thereof, or two exterior bodies are stacked with the inner surfaces facing each other, in which case application of heat melts the materials on the overlapping inner surfaces to cause fusion bonding between the two exterior bodies. In this manner, a sealing structure can be formed.

A portion where the sealing structure is formed by fusion bonding or the like of the exterior body is referred to as a sealing portion. In the case where the exterior body is folded inwardly, the sealing portion is formed in the place other than the fold, and a first region of the exterior body and a second region of the exterior body that overlaps with the first region are fusion-bonded, for example. In the case where two exterior bodies are stacked, the sealing portion is formed along the entire outer region by heat fusion bonding or the like.

<<Flexible Power Storage Device>>

With use of a flexible material selected from materials of the members described in this embodiment, a flexible lithium-ion storage battery can be fabricated. Deformable devices are currently under active research and development. For such devices, flexible power storage devices are demanded.

Figure 3A:
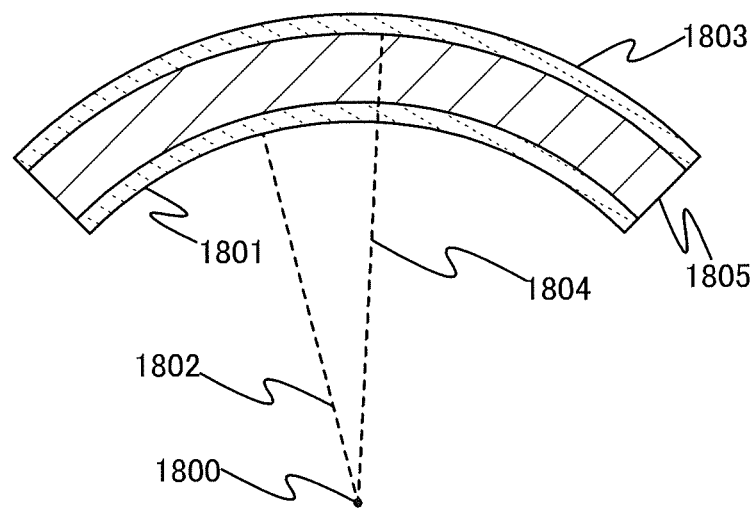
FIGS. 3A to 3D illustrate a flexible lithium-ion storage battery.
Figure 3B:
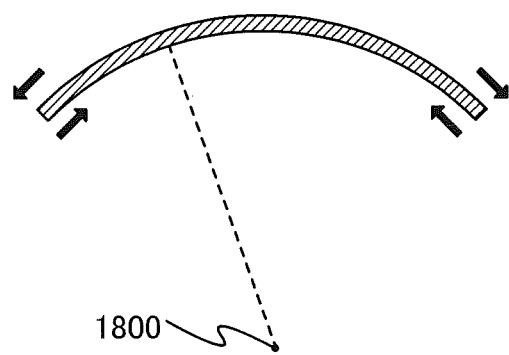

In the case of bending a power storage device in which a battery material 1805 including electrodes, an electrolyte, and the like is sandwiched between two films as exterior bodies, a radius 1802 of curvature of a film 1801 close to a center 1800 of curvature of the power storage device is smaller than a radius 1804 of curvature of a film 1803 far from the center 1800 of curvature (FIG. 3A). When the power storage device is curved and has an arc-shaped cross section, compressive stress is applied to a surface of the film on the side closer to the center 1800 of curvature and tensile stress is applied to a surface of the film on the side farther from the center 1800 of curvature (FIG. 3B).

When the flexible lithium-ion storage battery is deformed, a high stress is applied to the exterior bodies. However, even with the compressive stress and tensile stress due to the deformation of the power storage device, the influence of a strain can be reduced by forming a pattern including projections or depressions on surfaces of the exterior bodies. For this reason, the power storage device can change its shape such that the exterior body on the side closer to the center of curvature has a curvature radius of 50 mm, preferably 30 mm.

Figure 4A:
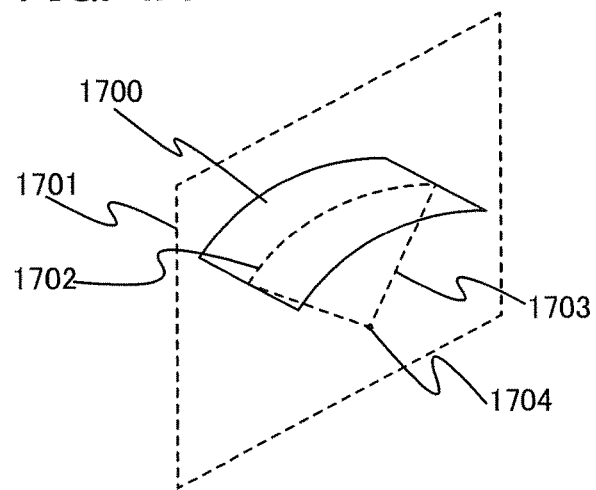
FIGS. 4A to 4C illustrate a flexible lithium-ion storage battery.
Figure 4B:
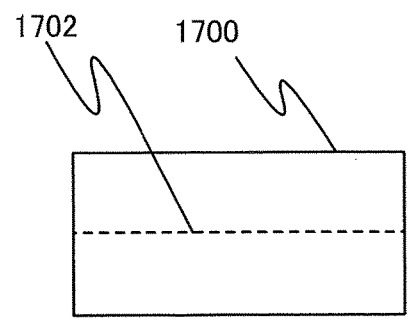
Figure 4C:
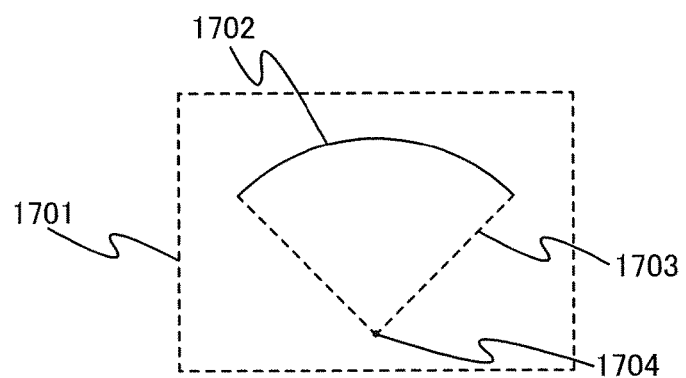

The radius of curvature of a surface is described with reference to FIGS. 4A to 4C. In FIG. 4A, on a plane 1701 along which a curved surface 1700 is cut, part of a curve 1702 forming the curved surface 1700 is approximate to an arc of a circle; the radius of the circle is referred to as a radius of curvature 1703 and the center of the circle is referred to as a center 1704 of curvature. FIG. 4B is a top view of the curved surface 1700. FIG. 4C is a cross-sectional view of the curved surface 1700 taken along the plane 1701. When a curved surface is cut along a plane, the radius of curvature of a curve in a cross section differs depending on the angle between the curved surface and the plane or on the cut position, and the smallest radius of curvature is defined as the radius of curvature of a surface in this specification and the like.

Figure 3C:
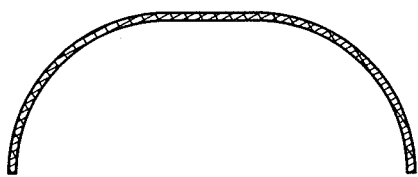
Figure 3D:
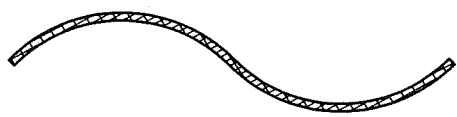

Note that the cross-sectional shape of the power storage device is not limited to a simple arc shape, and the cross section can be partly arc-shaped; for example, a shape illustrated in FIG. 3C, a wavy shape illustrated in FIG. 3D, or an S shape can be used. When the curved surface of the power storage device has a shape with a plurality of centers of curvature, the power storage device can change its shape such that a curved surface with the smallest radius of curvature among radii of curvature with respect to the plurality of centers of curvature, which is a surface of the exterior body on the side closer to the center of curvature, has a curvature radius of 50 mm, preferably 30 mm.

<<Assembly of Power Storage Device and Aging>>

Next, the above-mentioned components are combined and enclosed in the exterior body 109, so that the positive electrode current collector 100, the positive electrode active material layer 101, the graphene compound 105 that is a solid electrolyte layer, the negative electrode active material layer 103, and the negative electrode current collector 102 are stacked and enclosed in the exterior body 109 as illustrated in FIGS. 1A and 1B.

Then, an aging step may be performed. First, environmental temperature is kept at about room temperature for example, and constant current charge is performed to a predetermined voltage at a low rate. Next, a gas generated in a region inside the exterior body by charging is released outside the exterior body, and then charge is performed at a rate higher than that of the initial charge.

After that, the power storage device is preserved at relatively high temperatures for a long time. For example, the power storage device is preserved at higher than or equal to 40° C. for longer than or equal to 24 hours.

After the power storage device is preserved at relatively high temperatures for a long time, a gas generated in a region inside the exterior body is released again. Furthermore, the power storage device is discharged at room temperature, charged at the same rate, discharged at the same rate again, and further charged at the same rate. Then, discharge is performed at the same rate, which terminates the aging step.

In the aforementioned manner, the power storage device of one embodiment of the present invention can be fabricated.

This embodiment can be combined with any of the other embodiments as appropriate.

Note that in the case where at least one specific example is described in a diagram or text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the invention is clear.

Note that in this specification and the like, a content described in at least a diagram (which may be part of the diagram) is disclosed as one embodiment of the invention, and one embodiment of the invention can be constituted. Therefore, when a certain content is described in a diagram, the content is disclosed as one embodiment of the invention even when the content is not described with text, and one embodiment of the invention can be constituted. In a similar manner, part of a diagram, which is taken out from the diagram, is disclosed as one embodiment of the invention, and one embodiment of the invention can be constituted. The embodiment of the invention is clear.

Embodiment 3

Described in this embodiment will be examples of electronic devices including the power storage devices of one embodiment of the present invention.

FIGS. 5A to 5F illustrate examples of electronic devices each including a power storage device. Examples of electronic devices each including a power storage device include television devices (also referred to as televisions or television receivers), monitors of computers or the like, digital cameras, digital video cameras, digital photo frames, cellular phones (also referred to as mobile phones or mobile phone devices), portable game machines, portable information terminals, audio reproducing devices, and large game machines such as pachinko machines.

In addition, a power storage device can be incorporated along a curved inside/outside wall surface of a house or a building or a curved interior/exterior surface of a car.

Figure 5A:
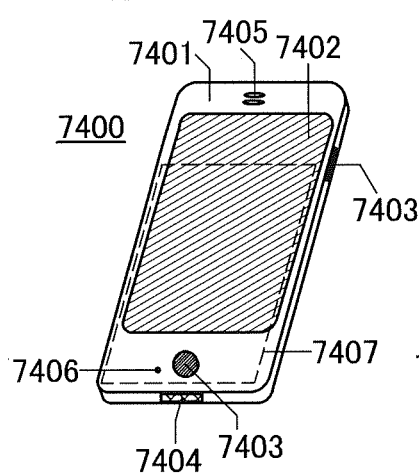
FIGS. 5A to 5F illustrate electronic devices of embodiments of the present invention.

FIG. 5A illustrates an example of a cellular phone. A cellular phone 7400 includes a display portion 7402 incorporated in a housing 7401, operation buttons 7403, an external connection port 7404, a speaker 7405, a microphone 7406, and the like. Note that the cellular phone 7400 includes a power storage device 7407.

Figure 5B:
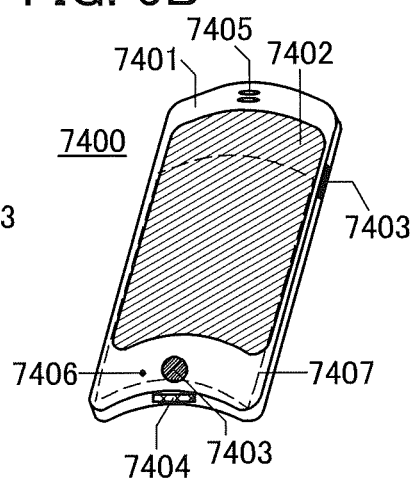
Figure 5C:
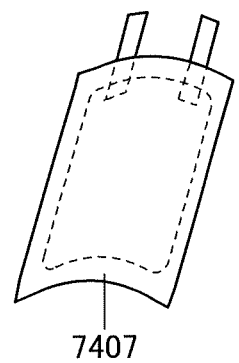

FIG. 5B illustrates the cellular phone 7400 that is bent. When the whole cellular phone 7400 is bent by external force, the power storage device 7407 included in the cellular phone 7400 is also bent. FIG. 5C illustrates the bent power storage device 7407. The power storage device 7407 is a thin power storage device. The power storage device 7407 is fixed while being bent. Note that the power storage device 7407 includes a lead electrode electrically connected to a current collector.

Figure 5D:
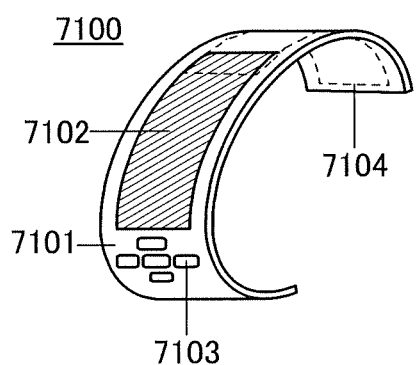
Figure 5E:
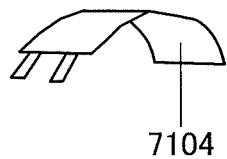
Figure 5F:
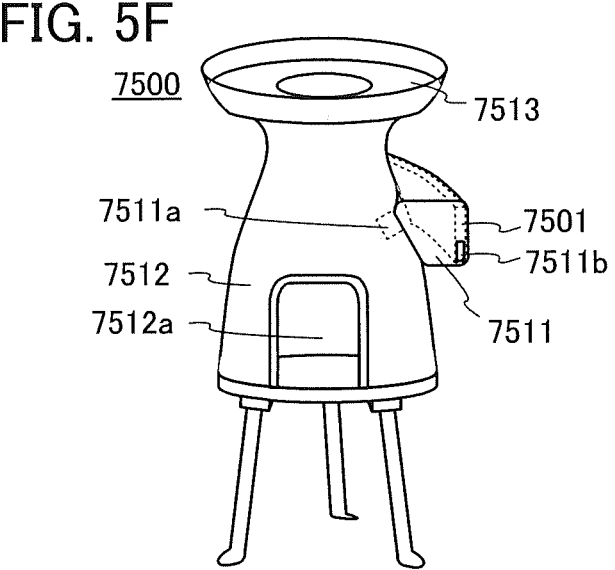

FIG. 5D illustrates an example of a bangle display device. A portable display device 7100 includes a housing 7101, a display portion 7102, operation buttons 7103, and a power storage device 7104. FIG. 5E illustrates the bent power storage device 7104. When the display device is worn on a user's arm while the power storage device 7104 is bent, the shape of the housing changes to change the curvature of part or the whole of the power storage device 7104. Note that the radius of curvature of a curve at a point refers to the radius of the circular arc that best approximates the curve at that point. The reciprocal of the radius of curvature is curvature. Specifically, part or the whole of the housing or the main surface of the power storage device 7104 is changed in the range of radius of curvature from 40 mm to 150 mm inclusive. When the radius of curvature at the main surface of the power storage device 7104 is 40 mm to 150 mm inclusive, the reliability can be kept high.

Furthermore, the flexile power storage device which can be bent by external force can be provided with high space efficiency in any of a variety of electronic devices. For example, in a stove 7500 illustrated in FIG. 5F, a module 7511 is attached to a main body 7512. The module 7511 includes a power storage device 7501, a motor, a fan, an air outlet 7511*a*, and a thermoelectric generation device. In the stove 7500, after a fuel is injected through an opening 7512*a* and ignited, outside air can be sent through the air outlet 7511*a* to the inside of the stove 7500 by rotating the motor and the fan which are included in the module 7511 using power of the power storage device 7501. In this manner, the stove 7500 can have strong heating power because outside air can be taken into the inside of the stove 7500 efficiently. In addition, cooking can be performed on an upper grill 7513 with thermal energy generated by the combustion of fuel. When the thermal energy is converted into power with the thermoelectric generation device of the module 7511, the power can be stored in the power storage device 7501. The power stored in the power storage device 7501 can be output through an external terminal 7511*b*.

Figure 6A:
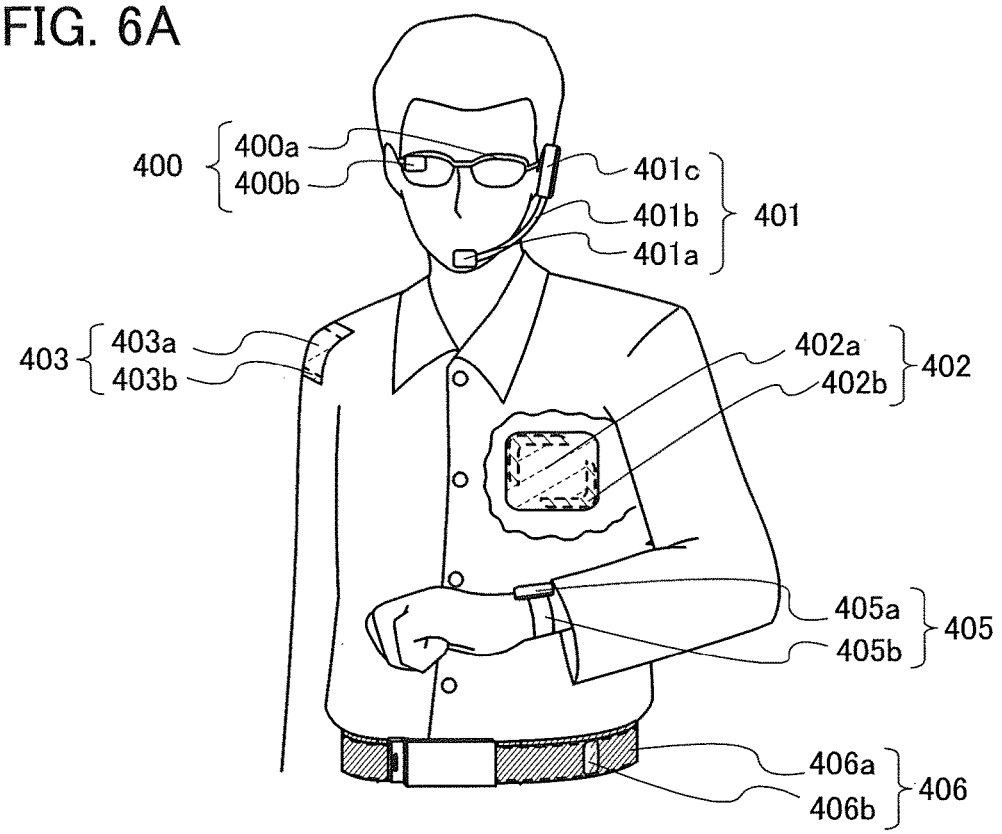
FIGS. 6A and 6B illustrate electronic devices of embodiments of the present invention.

The power storage device using the graphene compound of one embodiment of the present invention can be provided in wearable devices illustrated in FIG. 6A.

For example, the power storage device can be provided in a glasses-type device 400 illustrated in FIG. 6A. The glasses-type device 400 includes a frame 400*a* and a display portion 400*b*. The power storage device is provided in a temple of the frame 400*a* having a curved shape, whereby the glasses-type device 400 can have a well-balanced weight and can be used continuously for a long time.

The power storage device can also be provided in a headset-type device 401. The headset-type device 401 includes at least a microphone portion 401*a*, a flexible pipe 401*b*, and an earphone portion 401*c*. The power storage device can be provided in the flexible pipe 401*b* and the earphone portion 401*c*.

Furthermore, the power storage device can be provided in a device 402 that can be attached directly to a body. A power storage device 402*b* can be provided in a thin housing 402*a* of the device 402.

Furthermore, the power storage device can be provided in a device 403 that can be attached to clothes. A power storage device 403*b* can be provided in a thin housing 403*a* of the device 403.

Furthermore, the power storage device can be provided in a watch-type device 405. The watch-type device 405 includes a display portion 405*a* and a belt portion 405*b*, and the power storage device can be provided in the display portion 405*a* or the belt portion 405*b*.

The display portion 405*a* can display various kinds of information such as time and reception information of an e-mail or an incoming call.

In addition, the watch-type device 405 is a wearable device that is wound around an arm directly; thus, a sensor that measures the pulse, the blood pressure, or the like of the user may be incorporated therein. Data on the exercise quantity and health of the user can be stored to be used for health maintenance.

Furthermore, the power storage device can be provided in a belt-type device 406. The belt-type device 406 includes a belt portion 406*a* and a wireless power feeding and receiving portion 406*b*, and the power storage device can be provided inside the belt portion 406*a*.

Figure 6B:
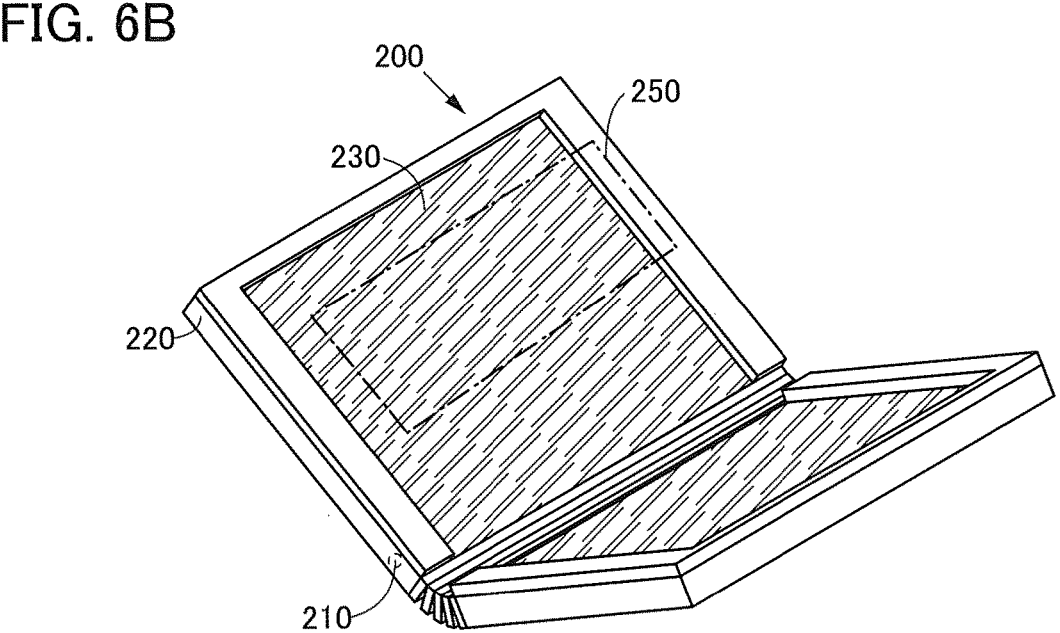

FIG. 6B is a projection view illustrating an example of an external view of a data processing device 200. The data processing device 200 described in this embodiment includes an arithmetic device 210, an input/output device 220, a display portion 230, and a power storage device 250.

The data processing device 200 includes a communication portion having a function of supplying data to a network and acquiring data from the network. Furthermore, image data may be generated in accordance with received data delivered to a specific space using the communication portion. For example, educational materials distributed from a classroom of a school or a university can be received and displayed to be used as a schoolbook. Alternatively, materials distributed from a conference room in, for example, a company can be received and displayed.

This embodiment can be combined with any of the other embodiments as appropriate.

Embodiment 4

Described in this embodiment will be examples of a vehicle including the power storage device of one embodiment of the present invention.

The use of the power storage device in vehicles can lead to next-generation clean energy vehicles such as hybrid electric vehicles (HEVs), electric vehicles (EVs), and plug-in hybrid electric vehicles (PHEVs).

Figure 7A:
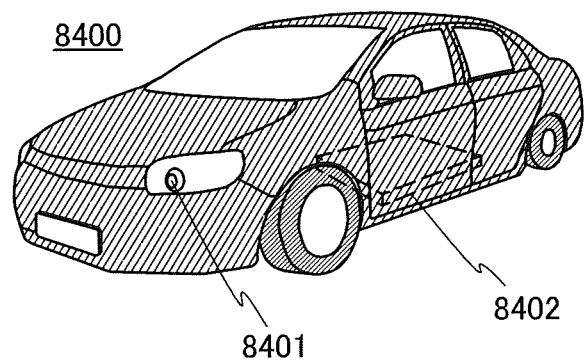
FIGS. 7A and 7B illustrate electronic devices of embodiments of the present invention.

An automobile 8400 illustrated in FIG. 7A is an example of a hybrid electric vehicle (HEV) provided with a power storage device 8402. The power storage device 8402 is used as a power supply for driving a vehicle or a power supply of a headlight 8401 or the like.

Figure 7B:
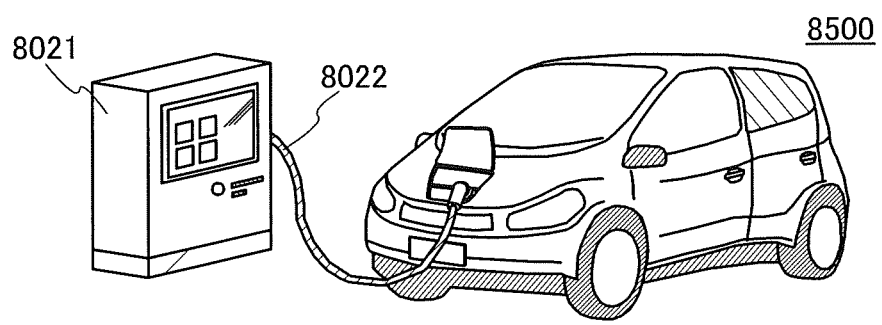

FIG. 7B illustrates an automobile 8500, which is an EV including the power storage device. The automobile 8500 can be charged when the power storage device is supplied with electric power through external charging equipment by a plug-in system, a contactless power feeding system, or the like. In FIG. 7B, a power storage device included in the automobile 8500 is charged with the use of a ground-based charging apparatus 8021 through a cable 8022.

In charge, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device included in the automobile 8500 can be charged by being supplied with electric power from outside. The charge can be performed by converting AC electric power into DC electric power through a converter such as an AC-DC converter.

Furthermore, although not illustrated, the vehicle may include a power receiving device so as to be charged by being supplied with electric power from an above-ground power transmitting device in a contactless manner. In the case of the contactless power feeding system, by fitting a power transmitting device in a road or an exterior wall, charge can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

Furthermore, the power storage device included in the vehicle can be used as a power source for supplying electric power to products other than the vehicle. In such a case, the use of a commercial power source can be avoided at peak time of electric power demand.

An example of a motorcycle using one embodiment of the present invention will be described with reference to FIG. 8.

Figure 8:
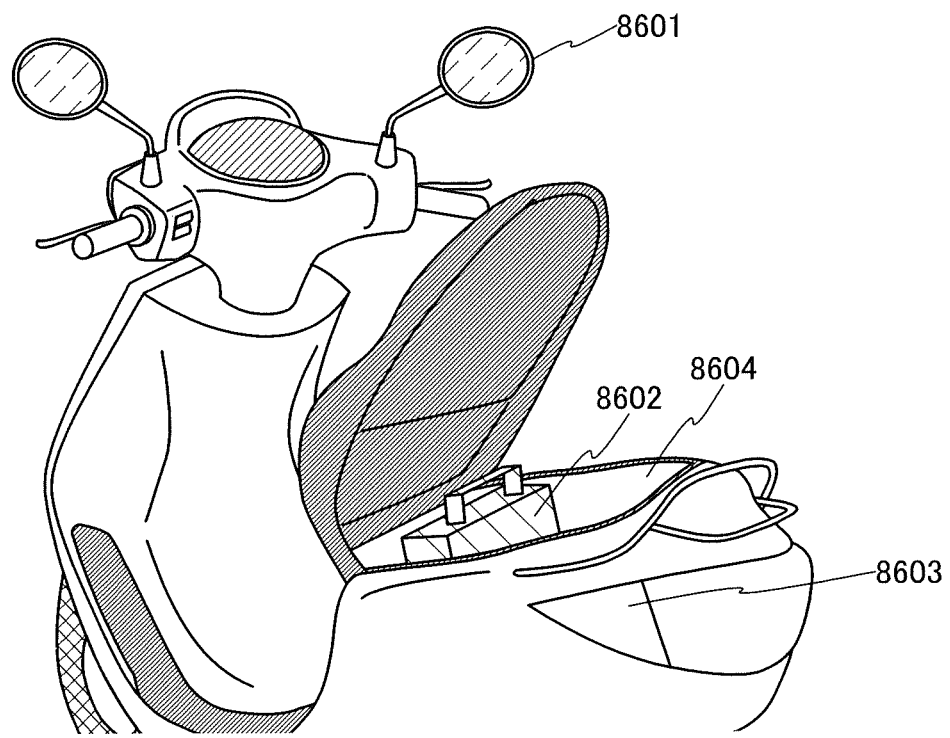
FIG. 8 illustrates an electronic device of one embodiment of the present invention.

A motor scooter 8600 illustrated in FIG. 8 includes a power storage device 8602, side mirrors 8601, and indicators 8603. The power storage device 8602 can supply electric power to the indicators 8603.

Furthermore, in the motor scooter 8600 illustrated in FIG. 8, the power storage device 8602 can be held in a storage unit under seat 8604. The power storage device 8602 can be held in the storage unit under seat 8604 even with a small size.

The power storage device 8602 used in this embodiment has high heat resistance and thus can be used in a severe environment, e.g., in a car for a long time. Furthermore, the power storage device 8602 in this embodiment can be used over a wide environmental temperature range and thus is useful.

This embodiment can be combined with any of the other embodiments as appropriate.

Example

In this example, synthesis examples of the graphene compound of one embodiment of the present invention described in Embodiment 1 are described.

Synthesis Example 1

First, a synthesis example of graphene oxide having a structure represented by the following structural formula (202) is described.

[Chemical Formula 16]

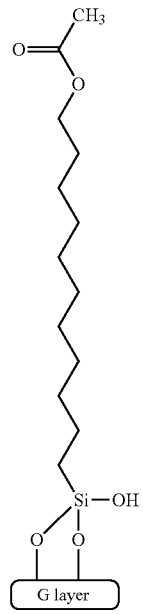

(202)

First, into a flask were put 0.41 g of graphene oxide (Rap dGO (TQ-11)-1 produced by NiSiNa materials Co., Ltd.) and 5.6 g (77 mmol) of n-butylamine. This mixed solution was irradiated with ultrasonic waves for 5 minutes and stirred at 60° C. for 1 hour, under a nitrogen stream. After the stirring, this mixed solution was cooled to room temperature, 20 mL of toluene was added to this mixed solution, and the obtained mixed solution was irradiated with ultrasonic waves for 5 minutes. After this mixed solution was cooled to 0° C., 11 g (31 mmol) of 11-acetoxyundecyltrichlorosilane was dripped into the mixed solution and the obtained mixed solution was stirred at 60° C. for 5 hours. After the stirring, this mixed solution was washed with toluene, and a residue was collected by suction filtration. The obtained residue was further washed with ethanol and acetone. The obtained residue was dried, whereby 0.52 g of target black powder (Sample 1) was obtained. The synthesis scheme (A) is shown below.

[Chemical Formula 17]

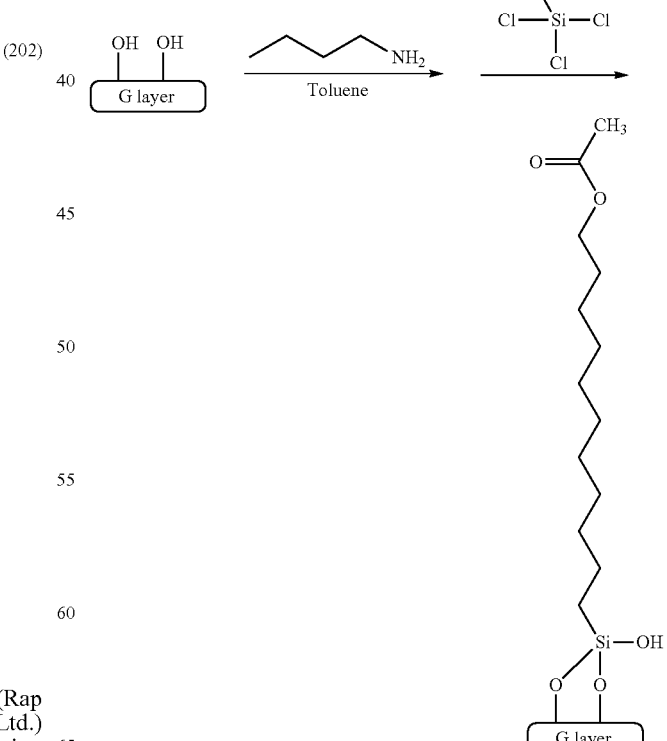

Synthesis Example 2

Next, another synthesis example of the graphene compound of one embodiment of the present invention described in Embodiment 1 is described. That is, a synthesis example of graphene oxide having a structure represented by the following structural formula (203) is described.

[Chemical Formula 18]

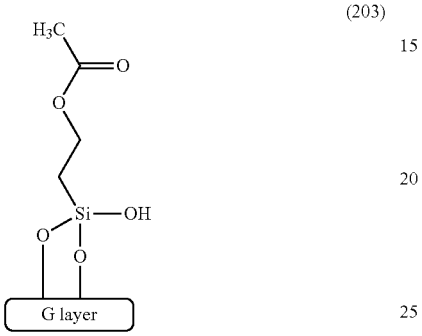

(203)

First, into a flask were put 0.61 g of graphene oxide (Rap dGO (TQ-11)-1 produced by NiSiNa materials Co., Ltd.) and 8.4 g (120 mmol) of n-butylamine. This mixed solution was irradiated with ultrasonic waves for 5 minutes and stirred at 60° C. for 1 hour, under a nitrogen stream. After the stirring, this mixed solution was cooled to room temperature, 30 mL of toluene was added to this mixed solution, and the obtained mixed solution was irradiated with ultrasonic waves for 5 minutes. After this mixed solution was cooled to 0° C., 10 g (47 mmol) of 2-acetoxyethyltrichlorosilane was dripped into the mixed solution and the obtained mixed solution was stirred at 60° C. for 5 hours. After the stirring, this mixed solution was washed with toluene, and a residue was collected by suction filtration. The obtained residue was further washed with ethanol and acetone. The obtained residue was dried, whereby 0.74 g of target black powder (Sample 2) was obtained. The synthesis scheme (B) is shown below.

[Chemical Formula 19]

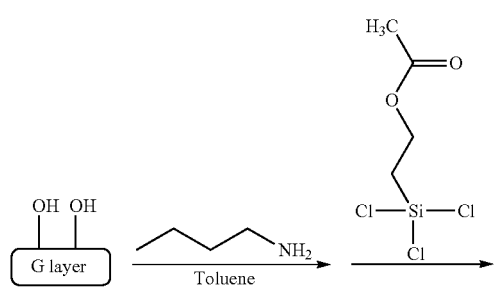

(B)

-continued

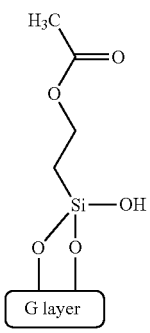

Synthesis Example 3

Next, another synthesis example of the graphene compound of one embodiment of the present invention described in Embodiment 1 is described. That is, a synthesis example of graphene oxide having a structure represented by the following structural formula (204) is described.

[Chemical Formula 20]

(204)

First, into a flask were put 0.61 g of graphene oxide (Rap dGO (TQ-11)-1 produced by NiSiNa materials Co., Ltd.) and 8.4 g (120 mmol) of n-butylamine. This mixed solution was irradiated with ultrasonic waves for 5 minutes and stirred at 60° C. for 1 hour, under a nitrogen stream. After the stirring, this mixed solution was cooled to room temperature, 30 mL of toluene was added to this mixed solution, and the obtained mixed solution was irradiated with ultrasonic waves for 5 minutes. After this mixed solution was cooled to 0° C., 10 g (47 mmol) of 2-(carbomethoxy)ethyltrichlorosilane was dripped into the mixed solution and the obtained mixed solution was stirred at 60° C. for 5 hours. After the stirring, this mixed solution was washed with toluene, and a residue was collected by suction filtration. The obtained residue was further washed with ethanol and acetone. The obtained residue was dried, whereby 0.45 g of target black powder (Sample 3) was obtained. The synthesis scheme (C) is shown below.

[Chemical Formula 21]

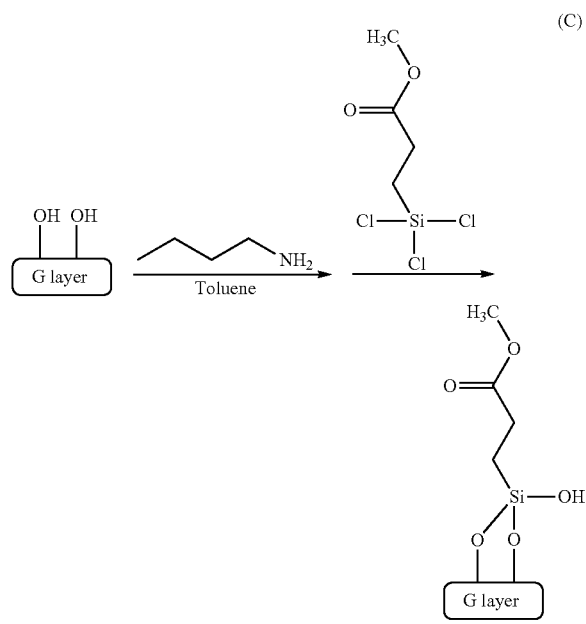

<FT-IR Analysis>

Fourier transform infrared spectroscopy (FT-IR) analysis was performed in order to determine whether the graphene compound was chemically modified in each of the above-mentioned synthesis examples 1 to 3.

The FT-IR analysis was performed on each of the chemically modified graphene compound formed in the aforementioned synthesis example 1 (Sample 1), the chemically modified graphene compound formed in the aforementioned synthesis example 2 (Sample 2), the chemically modified graphene compound formed in the aforementioned synthesis example 3 (Sample 3), and chemically unmodified graphene oxide (Comparative sample 1).

In the FT-IR analysis, attenuated total reflection (ATR) was performed using Nicolet NEXUS 670 produced by Thermo Fisher Scientific Inc. The measurement range was from 600 cm$^{-1}$ to 4000 cm$^{-1}$, the resolution was 4.0 cm$^{-1}$, and the number of times of scanning was 256.

Samples 1 to 3 were each in a film shape when the above-mentioned synthesis was completed; thus, an ATR prism was pressed onto each of the samples, and the samples were set in an analysis apparatus. Although Comparative sample 1 was powder, the ATR prism was pressed onto the comparative sample, and the comparative sample was set in the analysis apparatus.

Figure 9A:
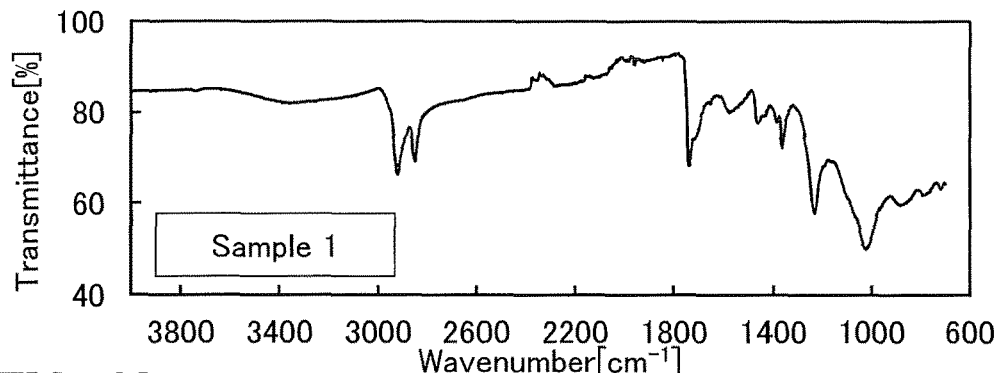
FIGS. 9A to 9D show results of FT-IR analyses.
Figure 9B:
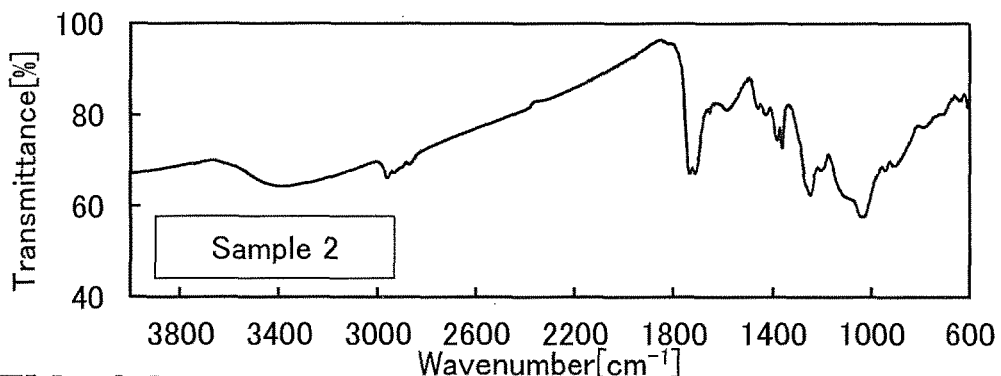
Figure 9C:
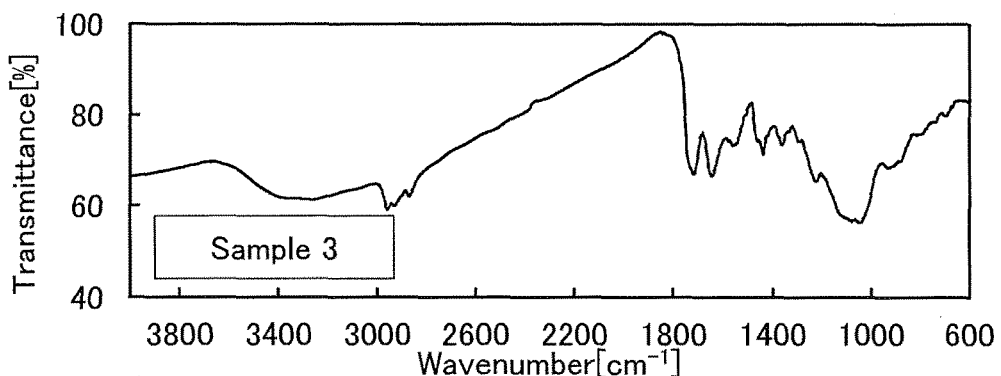
Figure 9D:
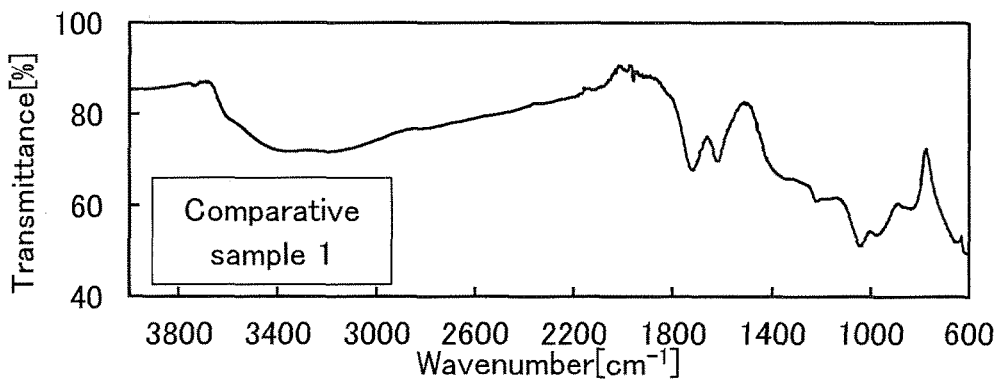

Results of the FT-IR analyses are shown in FIGS. 9A to 9D. FIG. 9A shows an FT-IR spectrum of Sample 1, FIG. 9B shows an FT-IR spectrum of Sample 2, FIG. 9C shows an FT-IR spectrum of Sample 3, and FIG. 9D shows an FT-IR spectrum of Comparative sample 1. The horizontal axis represents the wavenumber [cm$^{-1}$] and the vertical axis represents the transmissivity [%] in each of FIGS. 9A to 9D.

In the chemically unmodified graphene oxide (Comparative sample 1) shown in FIG. 9D, a peak that is probably assigned to C=O stretching vibration (around 1720 cm$^{-1}$) and a peak that is probably assigned to C=C stretching vibration (around 1620 cm$^{-1}$) were observed. That is, the FT-IR spectrum of the chemically unmodified graphene oxide was observed.

Meanwhile, in each of the chemically modified graphene compounds (Samples 1 to 3) shown in FIGS. 9A to 9C, a peak that is probably assigned to C—H stretching vibration (around 2900 cm$^{-1}$) and a peak that is probably assigned to C=O stretching vibration (around 1750 cm$^{-1}$) were observed. Unlike in the spectrum of the chemically unmodified graphene oxide (Comparative sample 1) shown in FIG. 9D, a peak that is probably assigned to an ester bond and an alkyl group was observed in each of FIGS. 9A to 9C.

Accordingly, the results indicate that Samples 1 to 3 were each chemically modified with the group having an ester bond.

<XRD Analysis>

X-ray diffraction (XRD) measurement was performed in order to determine the interlayer distance in the graphene compound in each of the above-mentioned synthesis examples 1 to 3.

The XRD measurement was performed on each of the chemically modified graphene compound formed in the aforementioned synthesis example 1 (Sample 1), the chemically modified graphene compound formed in the aforementioned synthesis example 2 (Sample 2), the chemically modified graphene compound formed in the aforementioned synthesis example 3 (Sample 3), and the chemically unmodified graphene oxide (Comparative sample 1).

The XRD measurement was performed using an X-ray diffractometer D8 ADVANCE produced by Bruker AXS. CuKα rays with a wavelength λ of 0.15418 nm were used as an X-ray source and a scanning range was 2θ=2 to 30 deg.

Figure 10A:
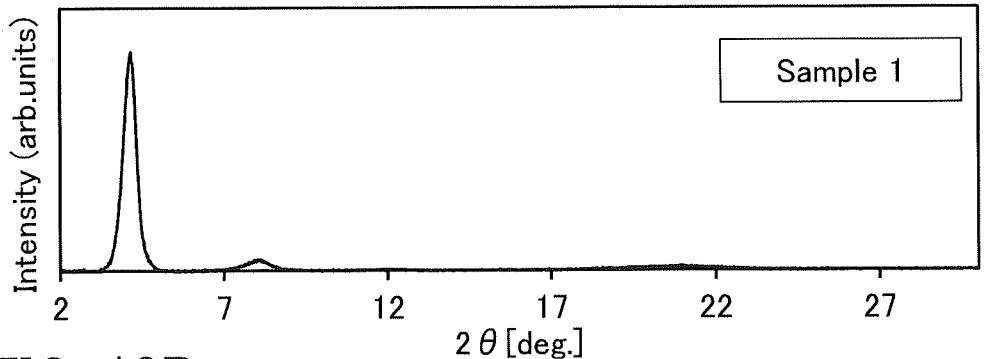
FIGS. 10A to 10D show results of XRD measurements.
Figure 10B:
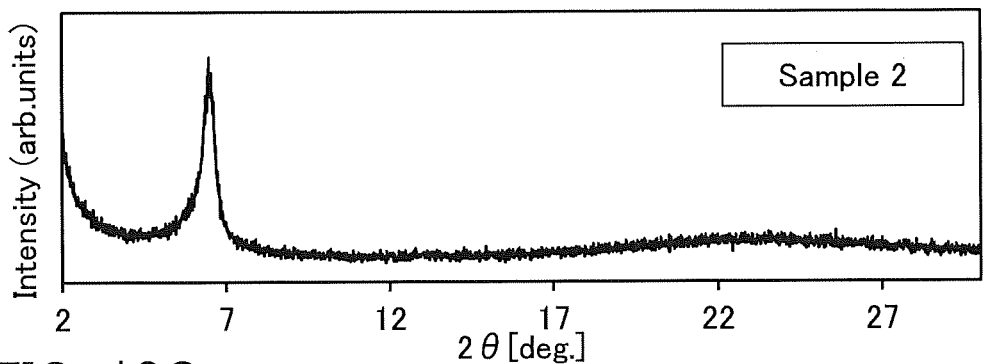
Figure 10C:
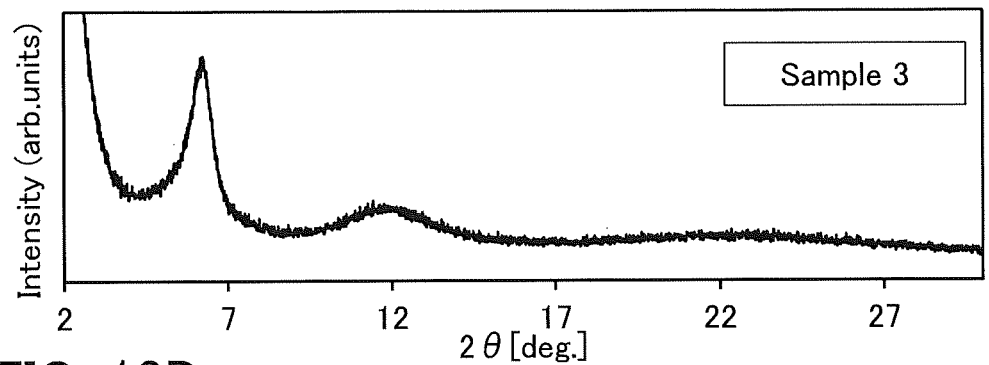
Figure 10D:
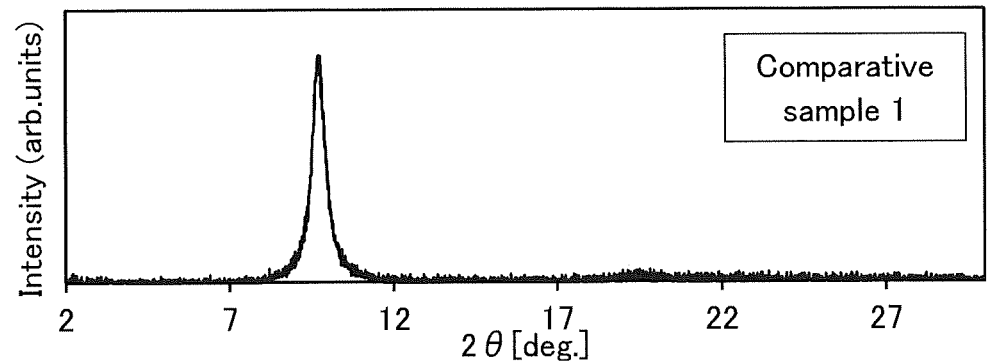

Results of the XRD measurements are shown in FIGS. 10A to 10D. FIG. 10A shows an XRD spectrum of Sample 1, FIG. 10B shows an XRD spectrum of Sample 2, FIG. 10C shows an XRD spectrum of Sample 3, and FIG. 10D shows an XRD spectrum of Comparative sample 1. The horizontal axis represents the diffraction angle 2θ [deg.] and the vertical axis represents the X-ray diffraction intensity (arbitrary unit) in each of FIGS. 10A to 10D.

A peak was observed in a range of 2θ=4 to 10 deg. in each of the samples. Table 1 shows the XRD peak angle and the average interlayer distance calculated from the peak angle. The average interlayer distance was calculated by the Bragg formula: 2d×sin θ=λ. Here, θ is an incident angle of an X-ray where an X-ray diffraction peak is obtained, d is distance between planes, and λ is a wavelength of an X-ray used for the XRD measurement.

TABLE 1

| | XRD peak angle 2θ[deg.] | Average interlayer distance [nm] |
|---|---|---|
| Sample 1 | 4.14 | 2.14 |
| Sample 2 | 6.50 | 1.36 |
| Sample 3 | 6.20 | 1.43 |
| Comparative sample 1 | 9.72 | 0.910 |

The average interlayer distance in each of Samples 1 to 3 which are chemically modified is larger than that in the chemically unmodified graphene oxide (Comparative sample 1). That is, the interlayer distance in the graphene oxide increased owing to chemical modification. In addition, the average interlayer distance in Sample 1 having a long functional group is larger than that in each of Sample 2 and Sample 3. That is, the longer a functional group included in the graphene oxide is, the larger average interlayer distance is. As the interlayer distance increases, the electron conductivity becomes low; thus, the graphene compound having a long functional group is favorable to prevent a short circuit (an internal short circuit) between a positive electrode and a negative electrode. The length of a functional group may be set so that desired electron conductivity is obtained.

Accordingly, it was found that the interlayer distance in each of Samples 1 to 3 increased owing to chemical modification. In the above-described manner, the graphene compounds of one embodiment of the present invention, which are chemically modified with a group having an ester bond, were synthesized.

REFERENCE NUMERALS

100: positive electrode current collector, 101: positive electrode active material layer, 102: negative electrode current collector, 103: negative electrode active material layer, 105: graphene compound, 107: separator, 109: exterior body, 110: lithium-ion storage battery, 120: lithium-ion storage battery, 200: data processing device, 210: arithmetic device, 220: input/output device, 230: display portion, 250: power storage device, 400: glasses-type device, 400a: frame, 400b: display portion, 401: headset-type device, 401a: microphone portion, 401b: flexible pipe, 401c: earphone portion, 402: device, 402a: housing, 402b: power storage device, 403: device, 403a: housing, 403b: power storage device, 405: watch-type device, 405a: display portion, 405b: belt portion, 406: belt-type device, 406a: belt portion, 406b: wireless power feeding and receiving portion, 1700: curved surface, 1701: plane, 1702: curve, 1703: radius of curvature, 1704: center of curvature, 1800: center of curvature, 1801: film, 1802: radius of curvature, 1803: film, 1804: radius of curvature, 1805: battery material, 7100: portable display device, 7101: housing, 7102: display portion, 7103: operation button, 7104: power storage device, 7400: cellular phone, 7401: housing, 7402: display portion, 7403: operation button, 7404: external connection port, 7405: speaker, 7406: microphone, 7407: power storage device, 7500: stove, 7501: power storage device, 7511: module, 7511a: air outlet, 7511b: external terminal, 7512: main body, 7512a: opening, 7513: grill, 8021: charging apparatus, 8022: cable, 8400: automobile, 8401: headlight, 8402: power storage apparatus, 8500: automobile, 8600: motor scooter, 8601: side mirror, 8602: power storage apparatus, 8603: indicator, and 8604: storage unit under seat.

This application is based on Japanese Patent Application Serial No. 2016-138106 filed with Japan Patent Office on Jul. 13, 2016, the entire contents of which are hereby incorporated by reference.

The invention claimed is:
1. A method for forming a graphene compound, comprising steps of:
   stirring graphene oxide and a Lewis base to form a first mixed solution;
   mixing a silicon compound into the first mixed solution and stirring the mixed solution to form a second mixed solution; and
   filtering the second mixed solution and collecting an obtained residue,
   wherein the silicon compound has a substituted silane group and a chain group bonded to the substituted silane group,
   wherein the chain group comprises an ester group, and
   wherein the residue comprises a graphene compound.
2. The method for forming a graphene compound, according to claim 1,
   wherein the Lewis base is one or more of butylamine, pentylamine, hexylamine, diethylamine, dipropylamine, dibutylamine, triethylamine, tripropylamine, and pyridine.
3. The method for forming a graphene compound, according to claim 1,
   wherein the silicon compound comprises 1 to 10 ester groups.
4. The method for forming a graphene compound, according to claim 1,
   wherein the steps of stirring to faun the first mixed solution, mixing the silicon compound into the first mixed solution, and stirring the mixed solution to form the second mixed solution is performed under an inert gas atmosphere.
5. A method for forming a graphene compound, comprising steps of:
   stirring graphene oxide and butylamine to form a first mixed solution;
   mixing a silicon compound into the first mixed solution and stirring the mixed solution to form a second mixed solution; and
   filtering the second mixed solution and collecting an obtained residue,
   wherein the silicon compound is one of 11-acetoxyundecyltrichlorosilane, 2-acetoxyethyltrichlorosilane, and 2-(carbomethoxy)ethyltrichlorosilane, and
   wherein the residue comprises a graphene compound.
6. The method for forming a graphene compound, according to claim 5,
   wherein the steps of stirring to form the first mixed solution, mixing the silicon compound into the first mixed solution, and stirring the mixed solution to Ruin the second mixed solution is performed under an inert gas atmosphere.

* * * * *